(12) United States Patent
Maheshwari

(10) Patent No.: US 7,057,819 B1
(45) Date of Patent: Jun. 6, 2006

(54) HIGH CONTRAST TILTING RIBBON BLAZED GRATING

(75) Inventor: Dinesh Maheshwari, Fremont, CA (US)

(73) Assignee: Silicon Light Machines Corporation, Sunnyvale, CA (US)

(*) Notice: Subject to any disclaimer, the term of this patent is extended or adjusted under 35 U.S.C. 154(b) by 306 days.

(21) Appl. No.: 10/322,202

(22) Filed: Dec. 17, 2002

(51) Int. Cl.
*G02B 5/18* (2006.01)

(52) U.S. Cl. .................. 359/571; 359/290; 359/573

(58) Field of Classification Search ............. 359/224, 359/572, 573, 290, 291, 292, 293, 294, 295, 359/571
See application file for complete search history.

(56) References Cited

U.S. PATENT DOCUMENTS

| | | | |
|---|---|---|---|
| 1,525,550 A | 2/1925 | Jenkins | |
| 1,548,262 A | 8/1925 | Freedman | |
| RE16,767 E | 10/1927 | Jenkins | |
| 1,814,701 A | 7/1931 | Ives | |
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chilayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Lamerd et al. | 29/626 |
| 3,861,784 A | 1/1975 | Torok | 350/162 R |
| 3,862,360 A | 1/1975 | Dill et al. | 178/7.3 D |

(Continued)

FOREIGN PATENT DOCUMENTS

DE 32 33 195 A1 3/1983

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

*Primary Examiner*—Mark A. Robinson
*Assistant Examiner*—Alessandro Amari
(74) *Attorney, Agent, or Firm*—Okamoto & Benedicto LLP

(57) ABSTRACT

The light modulator includes elongated elements and a support structure coupled to the elongated elements. Each element includes one or more lengthwise slits within an active optical area, and a light reflective planar surface with the light reflective planar surfaces lying in a grating plane. The support structure maintains a position of the elongated elements relative to each other and enables tilting of each element about a lengthwise axis. The elongated elements are tilted between a first modulator configuration wherein the elongated elements act to diffract an incident light into one or more diffraction orders, and a second modulator configuration wherein the elongated elements act to diffract the incident light into at least one diffraction order different than the one or more diffraction orders in the first modulator configuration.

16 Claims, 6 Drawing Sheets

U.S. PATENT DOCUMENTS

| | | | |
|---|---|---|---|
| 3,871,014 A | 3/1975 | King et al. ............... 357/67 |
| 3,886,310 A | 5/1975 | Guldberg et al. ......... 178/7.5 D |
| 3,896,338 A | 7/1975 | Nathanson et al. ......... 315/373 |
| 3,915,548 A | 10/1975 | Opittek ................. 350/3.5 |
| 3,935,499 A | 1/1976 | Oess .................... 313/413 |
| 3,935,500 A | 1/1976 | Oess et al. ............... 313/495 |
| 3,938,881 A | 2/1976 | Biegelsen et al. .......... 350/161 |
| 3,941,456 A | 3/1976 | Schilz et al. ............. 350/161 |
| 3,942,245 A | 3/1976 | Jackson et al. ............ 29/591 |
| 3,943,281 A | 3/1976 | Keller et al. ............. 178/7.5 D |
| 3,947,105 A | 3/1976 | Smith .................... 353/121 |
| 3,969,611 A | 7/1976 | Fonteneau ................ 219/502 |
| 3,980,476 A | 9/1976 | Wysocki .................. 96/1.1 |
| 3,991,416 A | 11/1976 | Byles et al. ............. 340/324 R |
| 4,001,663 A | 1/1977 | Bray ..................... 321/2 |
| 4,004,849 A | 1/1977 | Shattuck ................. 350/150 R |
| 4,006,968 A | 2/1977 | Ernstoff et al. .......... 350/160 LC |
| 4,009,939 A | 3/1977 | Okano .................... 350/162 SF |
| 4,011,009 A | 3/1977 | Lama et al. ............... 350/162 R |
| 4,012,116 A | 3/1977 | Yevick ................... 350/132 |
| 4,012,835 A | 3/1977 | Wallick .................. 29/591 |
| 4,017,158 A | 4/1977 | Booth .................... 350/162 SF |
| 4,020,381 A | 4/1977 | Oess et al. ............... 313/302 |
| 4,021,766 A | 5/1977 | Aine ..................... 338/2 |
| 4,034,211 A | 7/1977 | Horst et al. ............. 235/61.12 N |
| 4,034,399 A | 7/1977 | Drukier et al. ............ 357/68 |
| 4,035,068 A | 7/1977 | Rawson ................... 353/122 |
| 4,067,129 A | 1/1978 | Abramson et al. ........... 40/562 |
| 4,084,437 A | 4/1978 | Finnegan ................. 73/361 |
| 4,090,219 A | 5/1978 | Ernstoff et al. ........... 358/59 |
| 4,093,346 A | 6/1978 | Nishino et al. ........... 350/162 SF |
| 4,093,921 A | 6/1978 | Buss ..................... 325/459 |
| 4,093,922 A | 6/1978 | Buss ..................... 325/459 |
| 4,100,579 A | 7/1978 | Ernstoff .................. 358/230 |
| 4,103,273 A | 7/1978 | Keller ................... 338/2 |
| 4,126,380 A | 11/1978 | Borm ..................... 350/266 |
| 4,127,322 A | 11/1978 | Jacobson et al. ........... 353/31 |
| 4,135,502 A | 1/1979 | Peck ..................... 128/76.5 |
| 4,139,257 A | 2/1979 | Matsumoto ................ 350/6.1 |
| 4,143,943 A | 3/1979 | Rawson ................... 350/120 |
| 4,163,570 A | 8/1979 | Greenaway ................ 283/8 A |
| 4,184,700 A | 1/1980 | Greenaway ................ 283/6 |
| 4,185,891 A | 1/1980 | Kaestner ................. 350/167 |
| 4,190,855 A | 2/1980 | Inoue .................... 357/80 |
| 4,195,915 A | 4/1980 | Lichty et al. ............. 350/345 |
| 4,205,428 A | 6/1980 | Ernstoff et al. ........... 29/592 R |
| 4,211,918 A | 7/1980 | Nyfeler et al. ............ 235/454 |
| 4,223,050 A | 9/1980 | Nyfeler et al. ............ 427/163 |
| 4,225,913 A | 9/1980 | Bray ..................... 363/97 |
| 4,249,796 A | 2/1981 | Sincerbox et al. .......... 350/370 |
| 4,250,217 A | 2/1981 | Greenaway ................ 428/161 |
| 4,250,393 A | 2/1981 | Greenaway ................ 250/566 |
| 4,256,787 A | 3/1981 | Shaver et al. ............. 428/1 |
| 4,257,016 A | 3/1981 | Kramer, Jr. et al. ........ 322/7.51 |
| 4,290,672 A | 9/1981 | Whitefield ................ 350/358 |
| 4,295,145 A | 10/1981 | Latta .................... 346/108 |
| 4,311,999 A | 1/1982 | Upton et al. .............. 340/755 |
| 4,327,411 A | 4/1982 | Turner ................... 364/900 |
| 4,327,966 A | 5/1982 | Bloom .................... 350/162 R |
| 4,331,972 A | 5/1982 | Rajchman ................. 358/60 |
| 4,336,982 A | 6/1982 | Rector, Jr. ............... 350/358 |
| 4,338,660 A | 7/1982 | Kelley et al. ............. 364/200 |
| 4,343,535 A | 8/1982 | Bleha, Jr. ............... 350/342 |
| 4,346,965 A | 8/1982 | Sprague et al. ............ 350/358 |
| 4,348,079 A | 9/1982 | Johnson .................. 350/358 |
| 4,355,463 A | 10/1982 | Burns .................... 29/827 |
| 4,361,384 A | 11/1982 | Bosserman ................ 350/174 |
| 4,369,524 A | 1/1983 | Rawson et al. ............. 455/606 |
| 4,374,397 A | 2/1983 | Mir ...................... 358/75 |
| 4,389,096 A | 6/1983 | Hori et al. ............... 350/339 R |
| 4,391,490 A | 7/1983 | Hartke ................... 350/356 |
| 4,396,246 A | 8/1983 | Holman ................... 350/96.14 |
| 4,398,798 A | 8/1983 | Krawczak et al. .......... 350/162.24 |
| 4,400,740 A | 8/1983 | Traino et al. ............. 358/293 |
| 4,408,884 A | 10/1983 | Kleinknecht et al. ........ 368/355 |
| 4,414,583 A | 11/1983 | Hooker, III .............. 358/300 |
| 4,417,386 A | 11/1983 | Exner .................... 29/590 |
| 4,418,397 A | 11/1983 | Brantingham et al. ....... 364/900 |
| 4,420,717 A | 12/1983 | Wallace et al. ............ 318/696 |
| 4,422,099 A | 12/1983 | Wolfe .................... 358/293 |
| 4,426,768 A | 1/1984 | Black et al. .............. 29/583 |
| 4,430,584 A | 2/1984 | Someshwar et al. ......... 307/465 |
| 4,435,041 A | 3/1984 | Torok et al. .............. 350/162.24 |
| 4,440,839 A | 4/1984 | Mottier .................. 430/2 |
| 4,443,819 A | 4/1984 | Funada et al. ............. 358/236 |
| 4,443,845 A | 4/1984 | Hamilton et al. ........... 364/200 |
| 4,447,881 A | 5/1984 | Brantingham et al. ....... 364/488 |
| 4,454,591 A | 6/1984 | Lou ...................... 364/900 |
| 4,456,338 A | 6/1984 | Gelbart .................. 350/358 |
| 4,460,907 A | 7/1984 | Nelson ................... 346/153.1 |
| 4,462,046 A | 7/1984 | Spight ................... 358/101 |
| 4,467,342 A | 8/1984 | Tower .................... 357/30 |
| 4,468,725 A | 8/1984 | Venturini ................ 363/160 |
| 4,483,596 A | 11/1984 | Marshall ................. 350/385 |
| 4,484,188 A | 11/1984 | Ott ...................... 340/728 |
| 4,487,677 A | 12/1984 | Murphy ................... 204/247 |
| 4,492,435 A | 1/1985 | Banton et al. ............. 350/360 |
| 4,503,494 A | 3/1985 | Hamilton et al. ........... 364/200 |
| 4,511,220 A | 4/1985 | Scully ................... 350/403 |
| 4,538,883 A | 9/1985 | Sprague et al. ............ 350/356 |
| 4,545,610 A | 10/1985 | Lakritz et al. ............ 29/589 |
| 4,556,378 A | 12/1985 | Nyfeler et al. ............ 425/143 |
| 4,558,171 A | 12/1985 | Gantley et al. ............ 174/52 FP |
| 4,561,011 A | 12/1985 | Kohara et al. |
| 4,561,044 A | 12/1985 | Ogura et al. .............. 362/84 |
| 4,566,935 A | 1/1986 | Hornbeck ................. 156/626 |
| 4,567,585 A | 1/1986 | Gelbart .................. 369/97 |
| 4,571,041 A | 2/1986 | Gaudyn ................... 353/10 |
| 4,571,603 A | 2/1986 | Hornbeck et al. ........... 346/160 |
| 4,577,932 A | 3/1986 | Gelbart .................. 350/358 |
| 4,577,933 A | 3/1986 | Yip et al. ................ 350/358 |
| 4,588,957 A | 5/1986 | Balant et al. ............. 330/4.3 |
| 4,590,548 A | 5/1986 | Maytum ................... 363/161 |
| 4,594,501 A | 6/1986 | Culley et al. ............. 219/492 |
| 4,596,992 A | 6/1986 | Hornbeck ................. 346/76 PH |
| 4,615,595 A | 10/1986 | Hornbeck ................. 353/122 |
| 4,623,219 A | 11/1986 | Trias .................... 350/351 |
| 4,636,039 A | 1/1987 | Turner ................... 350/356 |
| 4,636,866 A | 1/1987 | Hattori .................. 358/236 |
| 4,641,193 A | 2/1987 | Glenn .................... 358/233 |
| 4,645,881 A | 2/1987 | LeToumelin et al. ........ 379/252 |
| 4,646,158 A | 2/1987 | Ohno et al. ............... 358/236 |
| 4,649,085 A | 3/1987 | Landram .................. 428/620 |
| 4,649,432 A | 3/1987 | Watanabe et al. ........... 358/241 |
| 4,652,932 A | 3/1987 | Miyajima et al. ........... 358/236 |
| 4,655,539 A | 4/1987 | Caulfield et al. .......... 350/3.6 |
| 4,660,938 A | 4/1987 | Kazan .................... 350/355 |
| 4,661,828 A | 4/1987 | Miller, Jr. et al. ........ 346/108 |
| 4,662,746 A | 5/1987 | Hornbeck ................. 350/269 |
| 4,663,670 A | 5/1987 | Ito et al. ................ 358/245 |
| 4,687,326 A | 8/1987 | Corby, Jr. ............... 356/5 |
| 4,698,602 A | 10/1987 | Armitage ................. 332/7.51 |
| 4,700,276 A | 10/1987 | Freyman et al. ............ 361/403 |
| 4,707,064 A | 11/1987 | Dobrowolski et al. ... 350/96.19 |
| 4,709,995 A | 12/1987 | Kuribayashi et al. ........ 350/350 |
| 4,710,732 A | 12/1987 | Hornbeck ................. 332/7.51 |
| 4,711,526 A | 12/1987 | Hennings et al. ........... 350/170 |
| 4,714,326 A | 12/1987 | Usui et al. ............... 350/485 |
| 4,717,066 A | 1/1988 | Goldenberg et al. ........ 228/179 |
| 4,719,507 A | 1/1988 | Bos ...................... 358/92 |
| 4,721,629 A | 1/1988 | Sakai et al. .............. 427/35 |
| 4,722,593 A | 2/1988 | Shimazaki ................ 350/336 |
| 4,724,467 A | 2/1988 | Yip et al. ................ 355/71 |
| 4,728,185 A | 3/1988 | Thomas ................... 353/122 |

| Patent No. | Date | Inventor | Class |
|---|---|---|---|
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/6.6 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunnaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 359/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 359/44.16 |
| 5,178,728 A | 1/1993 | Boysel et al. | 156/656 |
| 5,179,274 A | 1/1993 | Sampsell | 250/208.2 |

| | | | | | | | |
|---|---|---|---|---|---|---|---|
| 5,179,367 A | 1/1993 | Shimizu | 340/700 | 5,291,473 A | 3/1994 | Pauli | 369/112 |
| 5,181,231 A | 1/1993 | Parikh et al. | 377/26 | 5,293,511 A | 3/1994 | Poradish et al. | 257/434 |
| 5,182,665 A | 1/1993 | O'Callaghan et al. | 350/95 | 5,296,408 A | 3/1994 | Wilbarg et al. | 437/203 |
| 5,185,660 A | 2/1993 | Um | 358/60 | 5,296,891 A | 3/1994 | Vogt et al. | 355/67 |
| 5,188,280 A | 2/1993 | Nakao et al. | 228/123 | 5,296,950 A | 3/1994 | Lin et al. | 359/9 |
| 5,189,404 A | 2/1993 | Masimo et al. | 340/720 | 5,298,460 A | 3/1994 | Nishiguchi et al. | 437/183 |
| 5,189,505 A | 2/1993 | Bartelink | 257/419 | 5,299,037 A | 3/1994 | Sakata | 359/41 |
| 5,191,405 A | 3/1993 | Tomita et al. | 257/777 | 5,299,289 A | 3/1994 | Omae et al. | 359/95 |
| 5,192,864 A | 3/1993 | McEwen et al. | 250/234 | 5,300,813 A | 4/1994 | Joshi et al. | 257/752 |
| 5,192,946 A | 3/1993 | Thompson et al. | 340/794 | 5,301,062 A | 4/1994 | Takahashi et al. | 359/567 |
| 5,198,895 A | 3/1993 | Vick | 354/103 | 5,303,043 A | 4/1994 | Glenn | 348/40 |
| D334,557 S | 4/1993 | Hunter et al. | D14/114 | 5,303,055 A | 4/1994 | Hendrix et al. | 348/751 |
| D334,742 S | 4/1993 | Hunter et al. | D14/113 | 5,307,056 A | 4/1994 | Urbanus | 340/189 |
| 5,202,785 A | 4/1993 | Nelson | 359/214 | 5,307,185 A | 4/1994 | Jones et al. | 359/41 |
| 5,206,629 A | 4/1993 | DeMond et al. | 340/719 | 5,310,624 A | 5/1994 | Ehrlich | 430/322 |
| 5,208,818 A | 5/1993 | Gelbart et al. | 372/30 | 5,311,349 A | 5/1994 | Anderson et al. | 359/223 |
| 5,208,891 A | 5/1993 | Prysner | 385/116 | 5,311,360 A | 5/1994 | Bloom et al. | 359/572 |
| 5,210,637 A | 5/1993 | Puzey | 359/263 | 5,312,513 A | 5/1994 | Florence et al. | 156/643 |
| 5,212,115 A | 5/1993 | Cho et al. | 427/208 | 5,313,479 A | 5/1994 | Florence | 372/26 |
| 5,212,555 A | 5/1993 | Stoltz | 358/206 | 5,313,648 A | 5/1994 | Ehlig et al. | 395/800 |
| 5,212,582 A | 5/1993 | Nelson | 359/224 | 5,313,835 A | 5/1994 | Dunn | 73/505 |
| 5,214,308 A | 5/1993 | Nishiquchi et al. | 257/692 | 5,315,418 A | 5/1994 | Sprague et al. | 359/41 |
| 5,214,419 A | 5/1993 | DeMond et al. | 340/794 | 5,315,423 A | 5/1994 | Hong | 359/124 |
| 5,214,420 A | 5/1993 | Thompson et al. | 340/795 | 5,315,429 A | 5/1994 | Abramov | |
| 5,216,278 A | 6/1993 | Lin et al. | | 5,319,214 A | 6/1994 | Gregory et al. | 250/504 R |
| 5,216,537 A | 6/1993 | Hornbeck | 339/291 | 5,319,668 A | 6/1994 | Luecke | 372/107 |
| 5,216,544 A | 6/1993 | Horikawa et al. | 359/622 | 5,319,789 A | 6/1994 | Ehlig et al. | 395/800 |
| 5,219,794 A | 6/1993 | Satoh et al. | 437/209 | 5,319,792 A | 6/1994 | Ehlig et al. | 395/800 |
| 5,220,200 A | 6/1993 | Blanton | 257/728 | 5,320,709 A | 6/1994 | Bowden et al. | |
| 5,221,400 A | 6/1993 | Staller et al. | 156/292 | 5,321,416 A | 6/1994 | Bassett et al. | 345/8 |
| 5,221,982 A | 6/1993 | Faris | 358/93 | 5,323,002 A | 6/1994 | Sampsell et al. | 250/252.1 |
| 5,224,088 A | 6/1993 | Atiya | 369/97 | 5,323,051 A | 6/1994 | Adams et al. | 257/417 |
| D337,320 S | 7/1993 | Hunter et al. | D14/113 | 5,325,116 A | 6/1994 | Sampsell | 346/108 |
| 5,226,099 A | 7/1993 | Mignardi et al. | 383/19 | 5,327,286 A | 7/1994 | Sampsell et al. | 359/561 |
| 5,229,597 A | 7/1993 | Fukatsu | | 5,329,289 A | 7/1994 | Sakamoto et al. | 345/126 |
| 5,230,005 A | 7/1993 | Rubino et al. | 372/20 | 5,330,301 A | 7/1994 | Brancher | 414/417 |
| 5,231,363 A | 7/1993 | Sano et al. | 333/109 | 5,330,878 A | 7/1994 | Nelson | 430/311 |
| 5,231,388 A | 7/1993 | Stoltz | 340/783 | 5,331,454 A | 7/1994 | Hornbeck | 359/224 |
| 5,231,432 A | 7/1993 | Glenn | 353/31 | 5,334,991 A | 8/1994 | Wells et al. | 345/8 |
| 5,233,456 A | 8/1993 | Nelson | 358/214 | 5,339,116 A | 8/1994 | Urbanus et al. | 348/716 |
| 5,233,460 A | 8/1993 | Partlo et al. | 359/247 | 5,339,177 A | 8/1994 | Jenkins et al. | 359/35 |
| 5,233,874 A | 8/1993 | Putty et al. | 73/517 AV | 5,340,772 A | 8/1994 | Rosotker | 437/226 |
| 5,237,340 A | 8/1993 | Nelson | 346/108 | 5,345,521 A | 9/1994 | McDonald et al. | 385/19 |
| 5,237,435 A | 8/1993 | Kurematsu et al. | 359/41 | 5,347,321 A | 9/1994 | Gove | 348/663 |
| 5,239,448 A | 8/1993 | Perkins et al. | 361/764 | 5,347,378 A | 9/1994 | Handschy et al. | 359/53 |
| 5,239,806 A | 8/1993 | Maslakow | 53/432 | 5,347,433 A | 9/1994 | Sedlmayr | 348/32 |
| 5,240,818 A | 8/1993 | Mignardi et al. | 430/321 | 5,348,619 A | 9/1994 | Bohannon et al. | 156/664 |
| 5,245,686 A | 9/1993 | Faris et al. | 385/120 | 5,349,687 A | 9/1994 | Ehlig et al. | 395/800 |
| 5,247,180 A | 9/1993 | Mitcham et al. | 250/492.1 | 5,351,052 A | 9/1994 | D'Hont | 342/42 |
| 5,247,593 A | 9/1993 | Lin et al. | 385/17 | 5,352,926 A | 10/1994 | Andrews | 257/717 |
| 5,249,245 A | 9/1993 | Lebby et al. | 385/89 | 5,354,416 A | 10/1994 | Okudaira | 156/643 |
| 5,251,057 A | 10/1993 | Guerin et al. | 359/249 | 5,357,369 A | 10/1994 | Pilling et al. | 359/462 |
| 5,251,058 A | 10/1993 | MacArthur | 359/249 | 5,357,803 A | 10/1994 | Lane | 73/517 B |
| 5,254,980 A | 10/1993 | Hendrix et al. | 345/84 | 5,357,369 A | 10/1994 | Jambor et al. | 345/168 |
| 5,255,100 A | 10/1993 | Urbanus | 358/231 | 5,359,451 A | 10/1994 | Gelbart et al. | 359/285 |
| 5,256,869 A | 10/1993 | Lin et al. | 250/201.9 | 5,361,131 A | 11/1994 | Tekemori et al. | 356/355 |
| 5,258,325 A | 11/1993 | Spitzer et al. | 437/86 | 5,363,220 A | 11/1994 | Kuwayama et al. | 359/3 |
| 5,260,718 A | 11/1993 | Rommelmann et al. | 346/107 R | 5,365,283 A | 11/1994 | Doherty et al. | 348/743 |
| 5,260,798 A | 11/1993 | Um et al. | 358/233 | 5,367,585 A | 11/1994 | Ghezzo et al. | 385/23 |
| 5,262,000 A | 11/1993 | Welbourn et al. | 156/643 | 5,371,543 A | 12/1994 | Anderson | 348/270 |
| 5,272,473 A | 12/1993 | Thompson et al. | 345/7 | 5,371,618 A | 12/1994 | Tai et al. | 359/53 |
| 5,278,652 A | 1/1994 | Urbanus et al. | 358/160 | 5,382,961 A | 1/1995 | Gale, Jr. | 345/108 |
| 5,278,925 A | 1/1994 | Boysel et al. | 385/14 | 5,387,924 A | 2/1995 | Gale, Jr. et al. | 345/108 |
| 5,280,277 A | 1/1994 | Hornbeck | 345/108 | 5,389,182 A | 2/1995 | Mignardi | 156/344 |
| 5,281,887 A | 1/1994 | Engle | 310/335 | 5,391,881 A | 2/1995 | Jeuch et al. | 250/370.09 |
| 5,281,957 A | 1/1994 | Schoolman | 345/8 | 5,392,140 A | 2/1995 | Ezra et al. | 359/41 |
| 5,285,105 A | 2/1994 | Cain | 257/672 | 5,392,151 A | 2/1995 | Nelson | 359/223 |
| 5,285,196 A | 2/1994 | Gale, Jr. | 345/108 | 5,394,303 A | 2/1995 | Yamaji | 361/749 |
| 5,285,407 A | 2/1994 | Gale et al. | 365/189.11 | 5,398,071 A | 3/1995 | Gove et al. | 348/558 |
| 5,287,096 A | 2/1994 | Thompson et al. | 345/147 | 5,399,898 A | 3/1995 | Rostoker | 257/499 |
| 5,287,215 A | 2/1994 | Warde et al. | 359/293 | 5,404,365 A | 4/1995 | Hiiro | 372/27 |
| 5,289,172 A | 2/1994 | Gale, Jr. et al. | 345/108 | 5,404,485 A | 4/1995 | Ban | 395/425 |
| 5,291,317 A | 3/1994 | Newswanger | 359/15 | 5,408,123 A | 4/1995 | Murai | 257/531 |

| Patent | Date | Inventor | Class |
|---|---|---|---|
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 351/767 |
| 5,524,155 A | 6/1996 | Weaver | 385/24 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,552,635 A | 9/1996 | Kim et al. | |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 257/291 |
| 5,629,566 A | 5/1997 | Doi et al. | 257/785 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/572 |
| 5,689,361 A | 11/1997 | Damen et al. | 338/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 301/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |

| Patent No. | Kind | Date | Inventor | Class |
|---|---|---|---|---|
| 5,713,652 | A | 2/1998 | Zavracky et al. | 353/122 |
| 5,726,480 | A | 3/1998 | Pister | 257/415 |
| 5,731,802 | A | 3/1998 | Aras et al. | 345/148 |
| 5,734,224 | A | 3/1998 | Tagawa et al. | 313/493 |
| 5,742,373 | A | 4/1998 | Alvelda | 349/204 |
| 5,744,752 | A | 4/1998 | McHerron et al. | 174/52.4 |
| 5,745,271 | A | 4/1998 | Ford et al. | 359/130 |
| 5,757,354 | A | 5/1998 | Kawamura | 345/126 |
| 5,757,536 | A | 5/1998 | Ricco et al. | 359/224 |
| 5,764,280 | A | 6/1998 | Bloom et al. | 348/53 |
| 5,768,009 | A | 6/1998 | Little | 359/293 |
| 5,770,473 | A | 6/1998 | Hall et al. | 438/26 |
| 5,793,519 | A | 8/1998 | Furlani et al. | 359/291 |
| 5,798,743 | A | 8/1998 | Bloom | 345/90 |
| 5,798,805 | A | 8/1998 | Ooi et al. | 349/10 |
| 5,801,074 | A | 9/1998 | Kim et al. | 438/125 |
| 5,802,222 | A | 9/1998 | Rasch et al. | 385/1 |
| 5,808,323 | A | 9/1998 | Spaeth et al. | 257/88 |
| 5,808,797 | A | 9/1998 | Bloom et al. | 359/572 |
| 5,815,126 | A | 9/1998 | Fan et al. | 345/8 |
| 5,825,443 | A | 10/1998 | Kawasaki et al. | 349/95 |
| 5,832,148 | A | 11/1998 | Yariv | |
| 5,835,255 | A | 11/1998 | Miles | 359/291 |
| 5,835,256 | A | 11/1998 | Huibers | 359/291 |
| 5,837,562 | A | 11/1998 | Cho | 438/51 |
| 5,841,579 | A | 11/1998 | Bloom et al. | 359/572 |
| 5,841,929 | A | 11/1998 | Komatsu et al. | |
| 5,844,711 | A | 12/1998 | Long, Jr. | 359/291 |
| 5,847,859 | A | 12/1998 | Murata | 359/201 |
| 5,862,164 | A | 1/1999 | Hill | 372/27 |
| 5,868,854 | A | 2/1999 | Kojima et al. | 134/1.3 |
| 5,886,675 | A | 3/1999 | Aye et al. | 345/7 |
| 5,892,505 | A | 4/1999 | Tropper | 345/208 |
| 5,895,233 | A | 4/1999 | Higashi et al. | 438/107 |
| 5,898,515 | A | 4/1999 | Furlani et al. | 359/290 |
| 5,903,243 | A | 5/1999 | Jones | 345/7 |
| 5,903,395 | A | 5/1999 | Rallison et al. | 359/630 |
| 5,910,856 | A | 6/1999 | Ghosh et al. | 359/291 |
| 5,912,094 | A | 6/1999 | Aksyuk et al. | 430/5 |
| 5,912,608 | A | 6/1999 | Asada | 335/222 |
| 5,914,801 | A | 6/1999 | Dhuler et al. | 359/230 |
| 5,915,168 | A | 6/1999 | Salatino et al. | 438/110 |
| 5,919,548 | A | 7/1999 | Barron et al. | 428/138 |
| 5,920,411 | A | 7/1999 | Duck et al. | 359/127 |
| 5,920,418 | A | 7/1999 | Shiono et al. | 359/246 |
| 5,923,475 | A | 7/1999 | Kurtz et al. | 359/619 |
| 5,926,309 | A | 7/1999 | Little | 359/293 |
| 5,926,318 | A | 7/1999 | Hebert | 359/618 |
| 5,942,791 | A | 8/1999 | Shorrocks et al. | 257/522 |
| 5,949,390 | A | 9/1999 | Nomura et al. | 345/32 |
| 5,949,570 | A | 9/1999 | Shiono et al. | 359/618 |
| 5,953,161 | A | 9/1999 | Troxell et al. | 359/618 |
| 5,955,771 | A | 9/1999 | Kurtz et al. | 257/419 |
| 5,963,788 | A | 10/1999 | Barron et al. | 438/48 |
| 5,978,127 | A | 11/1999 | Berg | 359/279 |
| 5,982,553 | A | 11/1999 | Bloom et al. | 359/627 |
| 5,986,634 | A | 11/1999 | Alioshin | 345/126 |
| 5,986,796 | A | 11/1999 | Miles | 359/291 |
| 5,995,303 | A | 11/1999 | Honguh et al. | 359/708 |
| 5,999,319 | A | 12/1999 | Castracane | 359/573 |
| 6,004,912 | A | 12/1999 | Gudeman | 508/577 |
| 6,012,336 | A | 1/2000 | Eaton et al. | |
| 6,016,222 | A | 1/2000 | Setani et al. | 359/571 |
| 6,025,859 | A | 2/2000 | Ide et al. | 347/135 |
| 6,038,057 | A | 3/2000 | Brazas, Jr. et al. | 359/291 |
| 6,040,748 | A | 3/2000 | Gueissaz | 335/78 |
| 6,046,840 | A | 4/2000 | Huibers | 359/291 |
| 6,055,090 | A | 4/2000 | Miles | 359/291 |
| 6,057,520 | A | 5/2000 | Goodwin-Johansson | 200/181 |
| 6,061,166 | A | 5/2000 | Furlani et al. | 359/254 |
| 6,061,489 | A | 5/2000 | Ezra | 385/115 |
| 6,062,461 | A | 5/2000 | Sparks et al. | 228/123.1 |
| 6,064,404 | A | 5/2000 | Aras et al. | 345/507 |
| 6,069,392 | A | 5/2000 | Tai et al. | 257/419 |
| 6,071,652 | A | 6/2000 | Feldman et al. | 430/5 |
| 6,075,632 | A | 6/2000 | Braun | 359/124 |
| 6,084,626 | A | 7/2000 | Ramanujan et al. | 347/239 |
| 6,088,102 | A | 7/2000 | Manhart | 356/354 |
| 6,090,717 | A | 7/2000 | Powell et al. | 438/710 |
| 6,091,521 | A | 7/2000 | Popovich | 359/15 |
| 6,096,576 | A | 8/2000 | Corbin et al. | 438/108 |
| 6,096,656 | A | 8/2000 | Matzke et al. | |
| 6,097,352 | A | 8/2000 | Zavracky et al. | 345/7 |
| 6,101,036 | A | 8/2000 | Bloom | 359/567 |
| 6,115,168 | A | 9/2000 | Zhao et al. | 359/247 |
| 6,122,299 | A | 9/2000 | DeMars et al. | 372/20 |
| 6,123,985 | A | 9/2000 | Robinson et al. | 427/162 |
| 6,124,145 | A | 9/2000 | Stemme et al. | 438/26 |
| 6,130,770 | A | 10/2000 | Bloom | 359/224 |
| 6,144,481 | A | 11/2000 | Kowarz et al. | 359/291 |
| 6,147,789 | A | 11/2000 | Gelbart | 359/231 |
| 6,154,259 | A | 11/2000 | Hargis et al. | 348/756 |
| 6,154,305 | A | 11/2000 | Dickensheets et al. | |
| 6,163,026 | A | 12/2000 | Bawolek et al. | 250/351 |
| 6,163,402 | A | 12/2000 | Chou et al. | 359/443 |
| 6,169,624 | B1 | 1/2001 | Godil et al. | 359/237 |
| 6,172,796 | B1 | 1/2001 | Kowarz et al. | 359/290 |
| 6,172,797 | B1 | 1/2001 | Huibers | 359/291 |
| 6,177,980 | B1 | 1/2001 | Johnson | 355/67 |
| 6,181,458 | B1 | 1/2001 | Brazas, Jr. et al. | 359/290 |
| 6,188,519 | B1 | 2/2001 | Johnson | 359/572 |
| 6,195,196 | B1 | 2/2001 | Kimura et al. | 359/295 |
| 6,197,610 | B1 | 3/2001 | Toda | 438/50 |
| 6,210,988 | B1 | 4/2001 | Howe et al. | 438/50 |
| 6,215,579 | B1 | 4/2001 | Bloom et al. | 359/298 |
| 6,219,015 | B1 | 4/2001 | Bloom et al. | 345/87 |
| 6,222,954 | B1 | 4/2001 | Riza | 385/18 |
| 6,229,650 | B1 | 5/2001 | Reznichenko et al. | 359/566 |
| 6,229,683 | B1 | 5/2001 | Goodwin-Johansson | 381/233 |
| 6,241,143 | B1 | 6/2001 | Kuroda | 228/110.1 |
| 6,251,842 | B1 | 6/2001 | Gudeman | 508/577 |
| 6,252,697 | B1 | 6/2001 | Hawkins et al. | 359/290 |
| 6,254,792 | B1 | 7/2001 | Van Buskirk et al. | 216/13 |
| 6,261,494 | B1 | 7/2001 | Zavracky et al. | 264/104 |
| 6,268,952 | B1 | 7/2001 | Godil et al. | 359/291 |
| 6,271,145 | B1 | 8/2001 | Toda | 438/706 |
| 6,271,808 | B1 | 8/2001 | Corbin | 345/7 |
| 6,274,469 | B1 | 8/2001 | Yu | 438/592 |
| 6,290,859 | B1 | 9/2001 | Fleming et al. | 216/2 |
| 6,290,864 | B1 | 9/2001 | Patel et al. | 216/79 |
| 6,300,148 | B1 | 10/2001 | Birdsley et al. | 438/15 |
| 6,303,986 | B1 | 10/2001 | Shook | 257/680 |
| 6,307,663 | B1 * | 10/2001 | Kowarz | 359/231 |
| 6,310,018 | B1 | 10/2001 | Behr et al. | 510/175 |
| 6,323,984 | B1 | 11/2001 | Trisnadi | 359/245 |
| 6,327,071 | B1 | 12/2001 | Kimura | 359/291 |
| 6,342,960 | B1 | 1/2002 | McCullough | 359/124 |
| 6,356,577 | B1 | 3/2002 | Miller | 372/107 |
| 6,356,689 | B1 | 3/2002 | Greywall | 385/52 |
| 6,359,333 | B1 | 3/2002 | Wood et al. | 257/704 |
| 6,384,959 | B1 | 5/2002 | Furlani et al. | 359/291 |
| 6,387,723 | B1 | 5/2002 | Payne et al. | 438/48 |
| 6,392,309 | B1 | 5/2002 | Wataya et al. | 257/796 |
| 6,396,789 | B1 | 5/2002 | Guerra et al. | 369/112 |
| 6,421,179 | B1 | 7/2002 | Gutin et al. | 359/572 |
| 6,438,954 | B1 | 8/2002 | Goetz et al. | |
| 6,445,502 | B1 | 9/2002 | Islam et al. | 359/571 |
| 6,452,260 | B1 | 9/2002 | Corbin et al. | 257/686 |
| 6,466,354 | B1 | 10/2002 | Gudeman | 359/247 |
| 6,480,634 | B1 | 11/2002 | Corrigan | 385/4 |
| 6,497,490 | B1 | 12/2002 | Miller et al. | 359/614 |
| 6,525,863 | B1 | 2/2003 | Riza | 359/290 |
| 6,563,974 | B1 | 5/2003 | A. Riza | 385/18 |
| 6,565,222 | B1 | 5/2003 | Ishii et al. | 359/883 |
| 2001/0019454 | A1 | 9/2001 | Tadic-Galeb et al. | 359/649 |
| 2002/0015230 | A1 | 2/2002 | Pilossof et al. | 359/558 |

| | | | |
|---|---|---|---|
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131228 A1 | 9/2002 | Potter | |
| 2002/0131230 A1 | 9/2002 | Potter | 361/277 |
| 2002/0195418 A1 | 12/2002 | Kowarz et al. | |
| 2002/0196492 A1 | 12/2002 | Trisnadi et al. | |

FOREIGN PATENT DOCUMENTS

| | | |
|---|---|---|
| DE | 43 23 799 A1 | 1/1994 |
| DE | 197 23 618 A1 | 12/1997 |
| DE | 197 51 716 A1 | 5/1998 |
| DE | 198 46 532 C1 | 9/1999 |
| EP | 0 089 044 A2 | 9/1983 |
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 417 039 A1 | 3/1991 |
| EP | 0 423 513 A2 | 4/1991 |
| EP | 0 436 738 A1 | 7/1991 |
| EP | 0 458 316 A2 | 11/1991 |
| EP | 0 477 566 A2 | 4/1992 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 868 A1 | 6/1995 |
| EP | 0 658 830 A1 | 12/1995 |
| EP | 0 689 078 A1 | 10/1997 |
| EP | 0 801 319 A1 | 10/1997 |
| EP | 0 851 492 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1993 |
| GB | 2 296 152 A | 6/1996 |
| GB | 2 319 424 A | 5/1998 |
| JP | 53-39068 | 4/1978 |
| JP | 55-111151 | 8/1980 |
| JP | 57-31166 | 2/1982 |
| JP | 57-210638 | 12/1982 |
| JP | 60-49638 | 3/1985 |
| JP | 60-94756 | 5/1985 |
| JP | 60-250639 | 12/1985 |
| JP | 61-142750 | 6/1986 |
| JP | 61-145838 | 7/1986 |
| JP | 63-234767 | 9/1988 |
| JP | 63-305323 | 12/1988 |
| JP | 1-155637 | 6/1989 |
| JP | 40-1155637 | 6/1989 |
| JP | 2219092 | 8/1990 |
| JP | 4-333015 | 11/1992 |
| JP | 7-281161 | 10/1995 |
| JP | 3288369 | 3/2002 |
| WO | WO 90/13913 | 11/1990 |
| WO | WO 92/12506 | 7/1992 |
| WO | WO 93/02269 | 2/1993 |
| WO | WO 93/09472 | 5/1993 |
| WO | WO 93/18428 | 9/1993 |
| WO | WO 93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 01/04674 A1 | 1/2001 |
| WO | WO 01/006297 A3 | 1/2001 |
| WO | WO 01/57581 A3 | 8/2001 |
| WO | WO 02/025348 A3 | 3/2002 |
| WO | WO 02/31575 A2 | 4/2002 |
| WO | WO 02/058111 A2 | 7/2002 |
| WO | WO 02/065184 A3 | 8/2002 |
| WO | WO 02/073286 A2 | 9/2002 |
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

O. Solgarrd, "Integrated Semiconductor Light Modulators for Fiber-Optic and Display Applications", Ph.D. Dissertation, Stanford University Feb., 1992.

J. Neff, "Two-Dimensional Spatial Light Modulators: A Tutorial", Proceedings of the IEEE, vol. 78, No. 5 (May 1990), pp. 826-855.

R. Gerhard-Multhaupt, "Viscoelastic Spatial Light Modulators and Schlieren-Optical Systems for HDTV Projection Displays" SPIE vol. 1255 Large Screen Projection Displays 11 (1990), pp. 69-78.

R. Gerhard-Multhaupt, "Light-Valve Technologies for High-Definition Television Projection Displays", Displays vol. 12, No. 3/4, (1991), pp. 115-128.

O. Solgaard, F. Sandejas, and D. Bloom, "Deformable Grating Optical Modulator," Optics Letters, vol. 17, No. 9, May 1, 1992, New York, USA. pp. 688-690.

F. Sandejas, R. Apte, W. Banyai, and D. Bloom, "Surface Microfabrication of Deformable Grating Valve for High Resolution Displays," The 7th International Conference on Solid-State Sensors and Actuators.

P. Alvelda, "High-Efficiency Color Microdisplays," SID 95 Digest, pp. 307-311, 1995.

Worboys et al., "Miniature Display Technology for Integrated Helmut Systems," GEC Journal of Research, vol. 10, No. 2, pp. 111-118, Chelmsford, Essex, GB 1993.

M. Fam et al., "Color Separation by use of Binary Optics," Optics Letters. vol. 18:15 pp. 1214-1216, 1993.

P. Alvelda, "VLSI Microdisplays and Optoelectric Technology," MIT, pp. 1-93, 1995.

P. Alvelda, "VLSI Microdisplay Technology," Oct. 14, 1994.
D. Rowe, "Laser Beam Scanning," SPIE, vol. 2088, Oct. 5, 1993, 18-26.
L. Hornbeck, "Deformable-Mirror Spatial Light Modulators," Spatial Light Modulators and Applications III, Aug. 8, CA 1989, pp. 86-102.
Russick et al., "Supercritical Carbon Dioxide Extraction of Solvent from Micromachined Structures," Supercritical Fluids, Chapter 18, American Chemical Society, pp. 255-269, 1997.
Buhler et al., "Linear Array of Complementary Metal Oxide Semiconductor Double-Pass Metal Micromirrors," Optical Engineering, vol. 36, No. 5, pp. 1391-1398, May 1997.
Gani et al., "Variable Gratings for Optical Switching: Rigorous Electromagnetic Simulation and Design," Optical Engineering, vol. 38, No. 3, pp. 552-557, Mar. 1999.
R. Tepe, et al., "Viscoelastic Spatial Light Modulator with Active Matrix Addressing," Applied Optics, vol. 28, No. 22, New York, USA, pp. 4826-4834, Nov. 15, 1989.
W. Brinker, et al., "Deformation Behavior of Thin Viscoelastic Layers Used in an Active-Matrix-Addressed Spatial Light Modulator," SPIE vol. 1018, pp. 79-85, Germany, 1988.
T. Utsunomiya and H. Sato, "Electrically Deformable Echellette Grating and its Application to Tunable Laser Resonator," Electronics and Communications in Japan, vol. 63-c, No. 10, pp. 94-100, Japan, 1980.
Burns, D.M. et al., *Development of microelectromechanical variable blaze gratings*, Sensors and Actuators A, pp. 7-15, 1998.
R.N. Thomas, et al., "The Mirror-Matrix Tube: A Novel Light Valve for Projection Displays", IEEE Transactions on Electron Devices, vol. ED-22, No. 9, pp. 765-775, Sep. 1975.
J. Guldberg, et al., "An Aluminum/SiO2/Silicon-on-Sapphire Light Valve Matrix for Projection Displays," Applied Physics Letters, vol. 26, No. 7, pp. 391-393, Apr. 1975.
"Kitchen Computer", IBM Technical Disclosure Bulletin, vol. 37, No. 12, pp. 223-225, Dec. 1994.
"Image Orientation Sensing and Correction for Notepads", Research Disclosure, No. 34788, p. 217, Mar. 1993.
Beck Mason et al., "Directly Modulated Sampled Grating DBR Lasers for Long-Haul WDM Communication Systems" IEEE Photonics Technology Letters, vol. 9, No. 3, Mar. 1997.pp. 377 of 379.
N. J. Frigo et al., "A Wavelength-Division Multiplexed Passive Optical Network with Cost-Shared Components", IEEE Photonics Technology Letters, vol. 6, No. 11, Nov. 1994, pp. 1365 of 1367.
M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.
C. A. Turkatte, "Examining the Benefits of Tunable Lasers for Provisioning Bandwidth on Demand", EuroForum—Optical Components, Feb. 2001, pp. 1 of 10.
R. Plastow, "Tunable Lasers and Future Optical Networks", Forum-Tunable Laser, Aug. 2000, pp. 58 of 62.
Elizabeth Bruce, "Tunable Lasers", Communications, IEEE Spectrum, Feb. 2002, pp. 35 of 39.
M. G. Littman et al., "Spectrally Narrow Pulsed Dye Laser without Beam Expander", Applied Optics, vol. 17, No. 14, Jul. 15, 1978, 1978, pp. 2224 of 2227.

Apte et al., "Deformable Grating Light Valves for High Resolution Displays," Solid State Actuator Workshop, Hilton Head, South Carolina, Jun. 13-16, 1994.
Sene et al., "Polysilicon micromechanical gratings for optical modulation," Sensors and Actuators, vol. A57, pp. 145-151, 1996.
Amm et al., "Invited Paper: Grating Light Valve™ Technology: Update and Novel Applications," SID Digest, vol. 29, 1998.
Development of Digital MEMS-Based Display Technology Promises Improved Resolution, Contrast, and Speed, XP-000730009, 1997, pp. 33 of 34.
"Micromachined Opto-Electro/Mechanical Systems,", Electronic Systems, NASA Tech Briefs, Mar. 1997, pp. 50 & 52.
S.T. Pai, et al., "Electromigration in Metals", Received Jun. 4, 1976, p. 103-115.
Olga B. Spahn, et al., "High Optical Power Handling of Pop-Up Microelectromechanical Mirrors", Sandia National Laboratories, IEEE 2000, p. 51-52.
David M. Burns, et al. "Optical Power Induced Damage to Microelectromechanical Mirrors", Sensors and Actuators A 70, 1998, p. 6-14.
V.S. Aliev et al., "Development of Si(100) surface roughness at the initial stage of etching in F2 and XeF2 gases: ellipsometric study," Surface Science 442 (1999), pp. 206-214.
Xuan-Qi Wang et al., "Gas-Phase Silicon Etching with Bromine Trifluoride," Depart. of Electrical Engineering, 136-93 California Institute of Technology, 1997 IEEE, pp. 1505-1508.
Harold F. Winters, "Etch products from the reaction of XeF2 with SiO2, Si3N4, SiC, and Si in the presence of Ion Bombardment," IBM Research Laboratory, 1983 American Vacuum Society, pp. 927-931.
F.A. Houle, "Dynamics of SiF4 desorption during etching of silicon by XeF2," J. Chem. Phys. 87 (3), Aug. 1, 1987, pp. 1866-1872.
Mehran Mehregany, "Microelectromechanical Systems," 1993 IEEE, pp. 14-22.
D. Moser et al., "A CMOS Compatible Thermally Excited Silicon Oxide Beam Resonator with Aluminium Mirror," Physical Electronics Laboratory, 1991 IEEE, pp. 547-550.
M. Parameswaran et al., "Commercial CMOS Fabricated Integrated Dynamic Thermal Scene Simulator," 1991 IEEE, pp. 29.4.1-29.4.4.
M. Parameswaran et al., "CMOS Electrothermal Microactuators," Depart. of Electrical Engineering, 1990 IEEE, pp. 128-131.
U. Streller et al., "Selectivity in dry etching of Si(100) with XeF2 and VUV light," Applied Surface Science 106, (1996), pp. 341-346.
M.J.M. Vugts et al., "Si/XeF2 etching: Temperature dependence," 1996 American Vacuum Society, pp. 2766-2774.
P. Krummenacher et al., "Smart Temperature Sensor in CMOS Technology," Sensors and Actuators, A-21-A-23 (1990), pp. 636-638.
Henry Baltes, "CMOS as sensor technology," Sensors and Actuators A. 37-38, (1993), pp. 51-56.
Thomas Boltshauser et al., "Piezoresistive Membrane Hygrometers Based on IC Technology," Sensor and Materials, 5, 3, (1993), pp. 125-134.
Z. Parpia et al., "Modelling of CMOS Compatible High Voltage Device Structures," pp. 41-50.

Jon Gildemeister, "Xenon Difluoride Etching System," 1997, UC Berkeley MicroTabrication Manual Chapter 7.15, p. 2-5.

W. Riethmuller et al., "A smart accelerometer with on-chip electronics fabricated by a commercial CMOS process," Sensors and Actuators A. 31, (1992), 121-124.

W. Gopel et al., "Sensors- A Comprehensive Survey," vol. 7, Weinheim New York, 44 pgs.

D. E. Ibbotson et al., "Comparison of XeF2 and F-atom reations with Si and SiO2," 1984 American Institute of Physics, pp. 1129-1131.

D. E. Ibbotson et al., "Plasmaless dry etching of silicon with fluorine-containing compounds," 1984 American Institute of Physics, pp. 2939-2942.

M.H. Hecht et al., "A novel x-ray photoelectron spectroscopy study of the Al/SiO2 interfaces," 1985 American Institute of Physics, pp. 5256-52616.

Daniel L. Flamm et al., "XeF2 and F-Atom Reactions with Si: Their Significance for Plasma Etching,," Solid State Technology, V. 26, #4, Apr. 1983, pp. 117-121.

H.F. Winters et al., "The etching of silicon with XeF2 vapor," Appl. Phys. Lett. vol. 34, No. 1, Jan. 1979, pp. 70-73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison-Wesley, $2^{nd}$ edition, 1987, Adelphi University, pp. 163-169.

E. Hecht, "Optics", Addison-Wesley, $2^{nd}$ edition, 1987, Adelphi University, pp. 358-360.

T. Glaser et al., "Beam switching with binary single-order diffractive grating", XP-000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP-002183475, Dept. of Applied Physics Calcutta University, 1975, pp. 63-67.

J. W. Goodman, "Some Fundamental Properties of Speckle", XP-002181682, Dept. of Electrical Engineering, Stanford University, 1976, pp. 1146-1150.

Lingli Wang et al., "Speckle Reduction in Laser Projection Systems by Diffractive Optical Elements", XP-000754330, Applied Optics, Apr. 1, 1998, vol. 37, No. 10, pp. 1770-1775.

R.W. Corrigan et al., "Calibration of a Scanned Linear Grating Light-Valve, Projection System for E-Cinema Applications", Silicon Light Machines, SID'99, San Jose, CA, 27 pp. 1999.

R.W. Corrigan et al., "Calibration of a Scanned Linear Grating Light-Valve, Projection System", Silicon Light Machines, San Jose, CA, 4 pgs, May 18, 1999.

"Introduction to Cryptography", http://www.ssh.fi/tech/crypto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral-Density Filters," New Focus, Inc., Santa Clara, CA, www.newfocus.com, May 7, 1999.

J. Hawkes et al., "Laser Theory and Practice," Prentice Hall, New York, 1995, pp. 407-408.

C. Tew et al., "Electronic Control of a Digital Micromirror Device for Projection Displays", Proceedings of the 1994 IEEE International Solid-State Circuits Conference, 1994.

Henck, S.A., "Lubrication of Digital Micromirror Devices™", Tribology Letters, No. 3, pp. 239-247, 1997.

K. W. Goossen et al., "Silicon Modulator Based on Mechanically-Active Anti-Reflection Layer with 1 Mbit/sec Capability for Fiber-in-the-Loop Applications", IEEE Protonics Technology Letters, vol. 6, No. 9, Sep. 1994, pp. 1119-1121.

J. A. Walker et al., "Demonstration of a Gain Flattened Optical Amplifier with Micromechanical Equalizer Element", Lucent Technologies, pp. 13-14.

A. P. Payne et al., "Resonance Measurements of Stresses in $Al/Si_3N_4$ Micro-Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault-Tolerant Multiwavelength Programmable Fiber-Optic Attenuator Using a Two-Dimensional Digital Micromirror Device", Optics Letters, Mar. 1, 1999, vol. 24, No. 5, pp. 282-284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309-2318.

P. Alveda et al., "44.4: Ferroelectric Microdisplays Using Distortion-Compensated Pixel Layouts", SID 95 Digest, XP 2020715, pp. 931-933.

* cited by examiner

HIGH CONTRAST TILTING RIBBON BLAZED GRATING

FIELD OF THE INVENTION

The present invention relates to an apparatus for increasing contrast of a light modulator. More particularly, this invention relates to a high-contrast tilting-ribbon blazed grating.

BACKGROUND OF THE INVENTION

Bloom et al. in U.S. Pat. No. 5,311,360, entitled "Method and Apparatus For Modulating A Light Beam," teach a grating light valve™ type device which operates in a reflection mode and a diffraction mode. The grating light valve™ type device includes elongated elements suspended above a substrate. In the reflective mode, reflective surfaces of the grating light valve™ type device cause incident light to constructively combine to form reflected light. In the diffractive mode, the reflective surfaces of the grating light valve™ type device are separated by a quarter wavelength of the incident light to produce diffracted light. When the grating light valve™ type device is in the diffractive mode, the grating light valve™ type device predominantly diffracts light into a plus one diffraction order and a minus one diffraction order but also diffracts a small amount of light into higher diffraction orders.

Bloom et al. further teach an alternative grating light valve type device which operates in the reflection mode and in a blazed diffraction mode. The alternative grating light valve type device includes the elongated elements suspended above the substrate. For the alternative grating light valve type device, the elongated elements include off-axis neck portions at ends of each of the elongated elements. In the reflection mode, the elongated elements are parallel, causing incident light to reflect from the elongated elements and, thus, produce the reflected light. In the blazed diffraction mode, each of the elongated elements is rotated about an axis defined by the off-axis neck portions to produce a blazed diffraction.

Because the light modulator is switched between the reflection mode and the blazed diffraction mode and because the reflection mode diffracts small quantities of light into the same angles as does the blazed diffraction mode, a contrast between the non-activated state and the activated state is less than an optimum contrast.

What is needed is a blazed diffractive light modulator which provides higher contrast.

SUMMARY OF THE INVENTION

An embodiment of the present invention includes a light modulator. The light modulator includes elongated elements arranged in parallel and a support structure coupled to the elongated elements. Each element includes one or more lengthwise slits within an active optical area, and a light reflective planar surface with the light reflective planar surfaces lying in a grating plane. The support structure maintains a position of the elongated elements relative to each other and enables tilting of each element about a lengthwise axis. The elongated elements are tilted between a first modulator configuration wherein the elongated elements act to diffract an incident light into one or more diffraction orders, and a second modulator configuration wherein the elongated elements act to diffract the incident light into at least one diffraction order different than the two diffraction orders in the first modulator configuration.

The one or more slits can symmetrically divide the width of the element within the active optical area into a plurality of segments. A width of the slit can be equal to a width of a gap between each element. In the first modulator configuration, the incident light preferably impinges the active optical area of the elongated elements normal to the grating plane such that the one or more diffraction orders include a zeroth diffraction order normal to the grating plane and a second diffraction order at a second order angle determined by a pitch of the segments. In the second modulator configuration, the at least one diffraction order can comprise a first diffraction order at a first order angle determined by a pitch of the elongated elements. The second order angle can be about twice the first order angle. The second order angle can be about the first order angle times the sum of the number of slits plus one. In the second modulator configuration, the elongated elements can be tilted to a blaze angle with respect to the grating plane. The slits can be cut through the entire thickness of the elongated element. The slits can be formed by removing a corresponding portion of the reflective surface of the elongated element. Preferably, a length of the slits corresponds to a width of an active optical area on each elongated element. Alternatively, the length of the slits can be longer than the width of the active optical area. The lengthwise axis can be a center axis of the elongated element. The lengthwise axis can be an edge axis of the elongated element. The light modulator is preferably a grating light valve type device. The light modulator can include means for applying an electrical bias to each element to enable tilting of each element.

DETAILED DESCRIPTION OF THE EMBODIMENT'S

The present invention provides a light modulator that directs background energy away from a collected diffraction order, thereby improving the contrast of the device. The light modulator is preferably a diffraction light modulator that includes a plurality of tilt-able elements. Preferably, the elements are elongated ribbons arranged parallel to each other. Each element includes an element pitch equal to an element width plus a gap width between adjacent elements. Each element includes one or more slits along a length of the element within an active optical area. Preferably, the length of the slits is equal to the width of the active optical area. Alternatively, the length of the slits is longer than the width of the active optical area. The active optical area comprises the area on which an incident light impinges the elements. A slit width of each slit is preferably equal to the gap width. The slits essentially reduce the element pitch within the active optical area. In the case where the element includes one slit, the reduced element pitch is about one-half the element pitch. In operation, the diffraction light modulator operates in a non-active mode and an active mode. In the non-active mode, the elements are preferably configured as a flat mirror in a grating plane. The incident light preferably impinges the elements normal to the grating plane. Although most of the incident light is specularly reflected, a portion of the incident light is diffracted due to the gaps between the elements and the slits within the elements. This portion of the diffracted light is diffracted at a diffraction angle that is dependent on the reduced element pitch.

In the active mode, each element is tilted about a lengthwise axis of the element. The tilted elements approximate a blazed grating. Preferably, the lengthwise axis is a center axis of the element. Alternatively, the lengthwise axis runs along an edge of the element. The blazed grating diffracts the incident light at a first order diffraction angle relative to the incident light. The first order diffraction angle is dependant on the element pitch. Preferably, light diffracted at the first order diffraction angle is collected as first order light. Since the element pitch is about twice the reduced element pitch, in the case of a single slit, the portion of the light diffracted while in the non-active mode is diffracted at a diffraction angle approximately twice as large as the first order diffraction angle. This significantly improves the contrast of the collected first order light between the non-active mode and the active mode.

Figure 1:
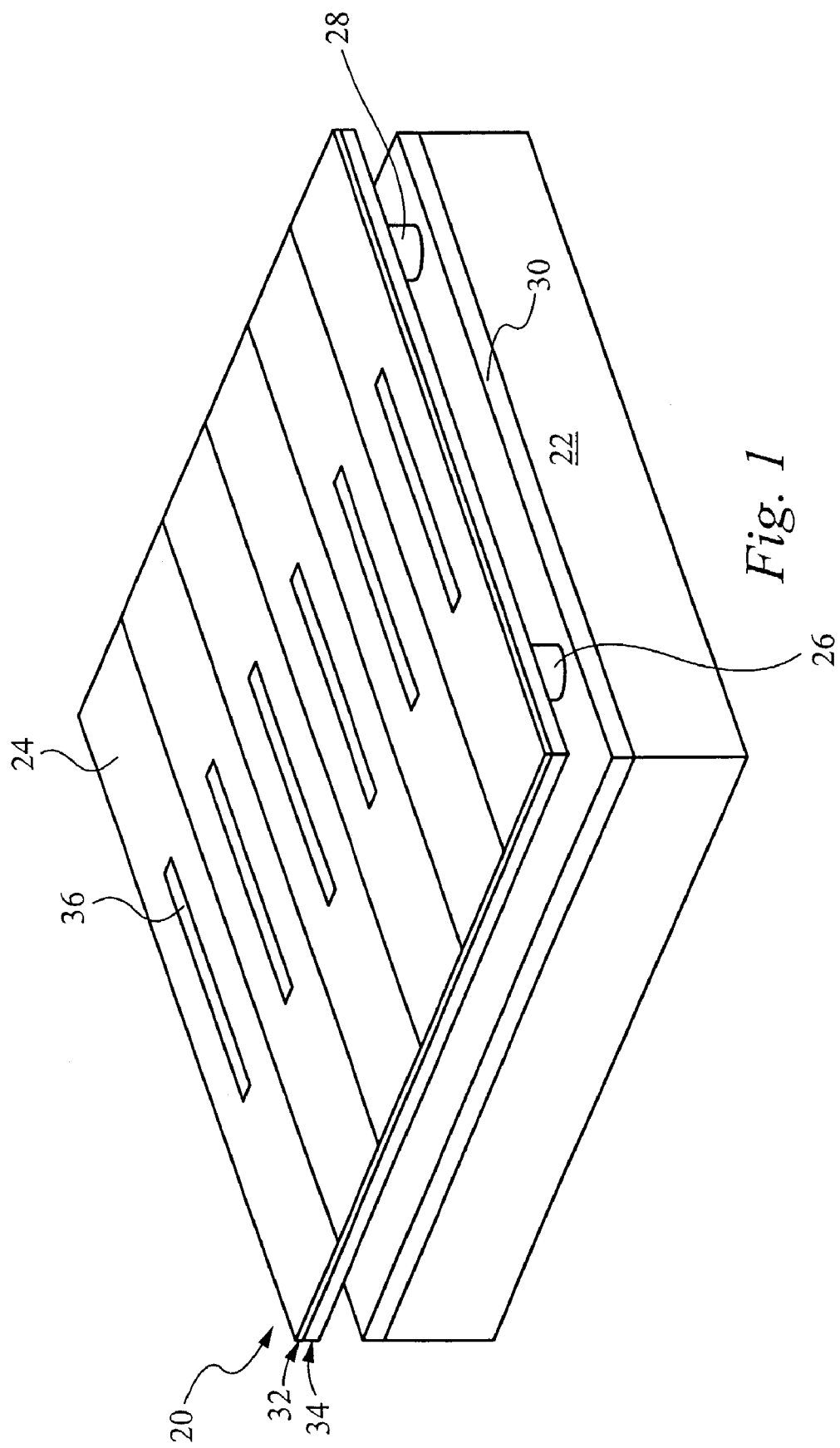
FIG. 1 illustrates a first embodiment of a preferred diffractive light modulator

A first embodiment of a preferred diffractive light modulator is illustrated isometrically in FIG. 1. The diffractive light modulator is preferably a grating light valve type device. A grating light valve type device 20 includes a substrate 22, elongated elements 24, first posts 26 (one shown), and second posts 28 (one shown). The substrate 22 includes a first conductor 30. The elongated elements 24 each preferably include a conductive and reflective surface 32 and a resilient material 34. Each elongated element 24 is coupled to the substrate 22 by the first post 26 and the second post 28, and also at the first and second ends (not shown). Preferably, the resilient material 34 comprises silicon nitride. Preferably, the conductive and reflective surface 32 comprises aluminum. Alternatively, the conductive and reflective surface 32 comprises a different metal. It is understood that although the grating light valve type device 20 illustrated in FIG. 1 includes six elongated elements 24, the grating light valve type device 20 can include more or less elongated elements 24.

It will be readily apparent to one skilled in the art that the conducting and reflecting surface 32 can be replaced by a multilayer dielectric reflector and a conducting element where the conducting element is buried within each of the elongated elements 24 or within just alternate ones of the elongated elements 24. Further, it will be readily apparent to one skilled in the art that the conducting and reflecting surface 32 can be coated with a transparent layer such as an anti-reflective layer.

Preferably, each elongated element 24 is a tilt-able ribbon. In this first embodiment, each elongated element includes a single lengthwise slit 36.

Figure 2A:
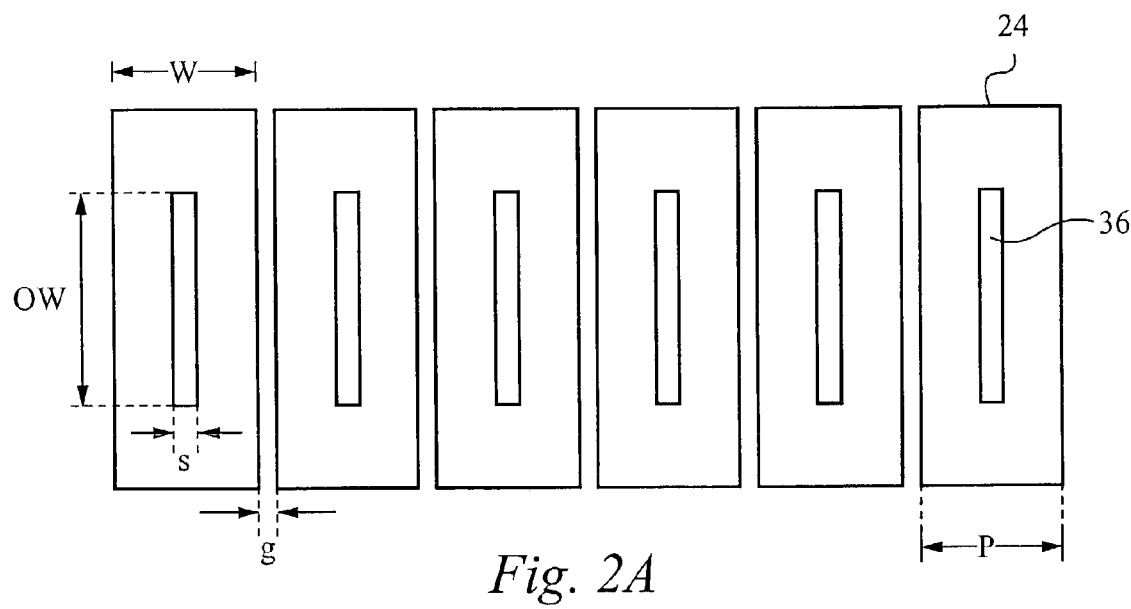
FIG. 2A illustrates a top-down view of the first embodiment of the elongated elements.

FIG. 2A illustrates a top-down view of the first embodiment of the elongated elements 24. Each elongated element 24 includes an element width W and is separated from an adjacent elongated element 24 by a gap width g. The slit 36 is at least as long as an optical width OW. The optical width OW corresponds to an active optical area of the grating light valve type device 20 on which the incident light impinges the elongated elements 24. The portion of the elongated elements 24 comprising the slits 36 includes the active optical area. A remaining portion of the elongated elements 24 that does not include the optical width OW is referred to as a non-active optical area. Each slit 36 includes a slit width S. Preferably, the slit width S and the gap width g are equal. An element pitch P is defined as the element width W plus the gap width g.

Figure 2B:
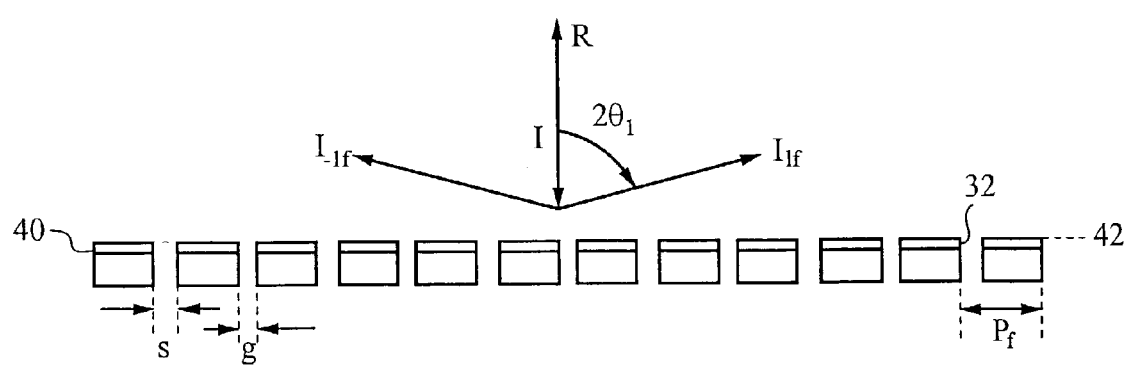
FIG. 2B illustrates a first cross-sectional view of the first embodiment of the elongated elements in the active optical area.

FIG. 2B illustrates a first cross-sectional view of the first embodiment of the elongated elements 24 in the active optical area. Preferably each slit 36 cuts through the entire thickness of the elongated element 24, and equally divides each elongated element 24 into two element portions 40 within the optical width OW. This essentially doubles the number of elongated elements within the active optical area, in the case of the first embodiment. A width of the element portion 40 is about one-half the element width W. The first cross-sectional view of the first embodiment illustrated in FIG. 2B shows the elongated elements 24 in a non-activated state. The non-activated state is also referred to as a flat state. In the flat state, the elongated elements 24 include a pitch Pf, and the conductive and reflective surfaces 32 define a grating plane 42. By halving the element width within the active optical area, the pitch Pf is also essentially halved when compared to the element pitch P. In the flat state, there is preferably zero electrical bias between the elongated elements 24 and the first conductor 30 (FIG. 1). The incident light I of wavelength λ preferably impinges the element portions 40 normal to the grating plane 42.

In the flat state, the incident light I is reflected off the elongated elements 24 into a zeroth diffraction order as reflected light R. Ideally, all incident light I is specularly reflected while in the non-activated state. However, due to the gaps between the elongated elements 24 and the slits 36 within the elongated elements 24, the incident light I is also diffracted into various orders of light.

In general, each diffraction order is defined by a diffraction angle θ measured from the normal incident light I. The first maxima of diffracted light is considered the first order light. The diffraction angle θ is defined as:

$$\theta = arcsin(m(\lambda/P))$$

where m=0, ±1, ±2, ... such that m=0 for zero order light, m=±1 for first order light, m =±2 for second order light and so on, and P is the pitch within the active optical area.

In the case where there are no slits 36 within the elongated elements 24, the pitch is the element pitch P=W+g. Since the diffraction angles are sufficiently small, a first order diffraction angle θ1 can be approximated as:

$$\theta 1 = \lambda/(W+g)$$

and a second order diffraction angle θ2 can be approximated as:

$$\theta 2 = 2(\lambda/(W+g)) = 2\ \theta 1.$$

The higher order diffraction angles are similarly approximated. While in the flat state, the incident light I is reflected into the zeroth order as reflected light R and also diffracted into various orders of light due to the gaps between the elongated elements 24 (in this case there are no slits 36). A first maxima of the diffracted light while in the flat state is located at the first order diffraction angle θ1. I1 represents the intensity of the first maxima of diffracted light collected at the first order diffraction angle θ1 while in the flat state. In the no-slit case, a first order diffraction angle θ1f in the flat state and a first order diffraction angle θ1B in a blazed state, which is discussed below, each correspond to the diffraction angle θ1.

Referring to FIG. 2B, there is one slit 36 within each elongated element 24, and the pitch becomes the pitch Pf. While in the flat state, a first order maxima of the diffracted light is located at the diffraction angle θ1f=arcsine (2λ/(W+ g)) where P is replaced by Pf. As can be seen in FIG. 2B, Pf is approximately (W+g)/2. Since the diffraction angles are sufficiently small, the diffraction angle θ1f can be approximated as:

$$\theta 1f = 2(\lambda/(W+g)).$$

Since λ/(W+g) is the first order diffraction angle θ1 when the elongated elements 24 do not have a slit 36, then θ1f can be approximated as:

$$\theta 1f = 2\theta 1 = \theta 2.$$

I1f represents the intensity of the first order maxima of diffracted light collected at the first order diffraction angle θ1f while in the flat state. By introducing a single slit 36 into each elongated element 24, the pitch is effectively halved. This has the effect of shifting the first order maxima of the diffracted light while in the flat state from the diffraction angel θ1 to the diffraction angle θ2.

Figure 2C:
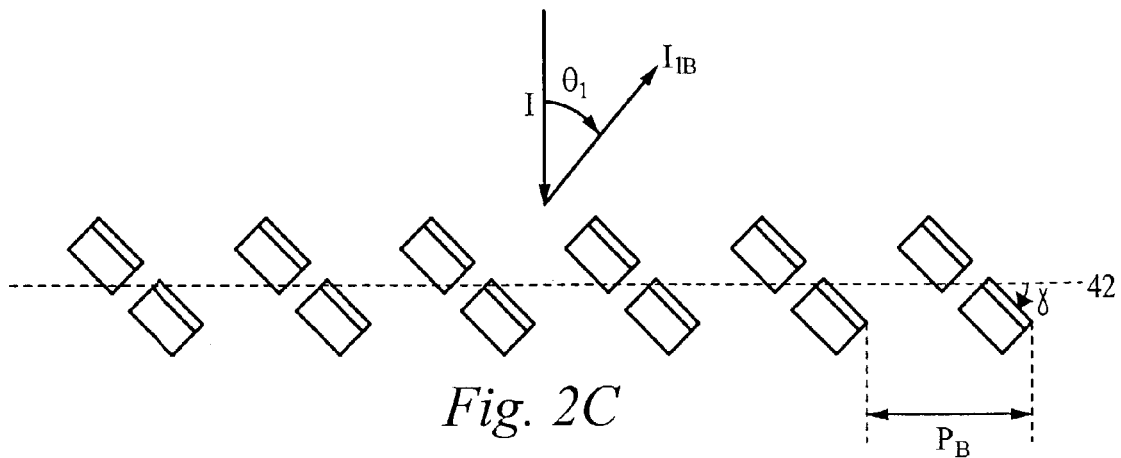
FIG. 2C illustrates a second cross-sectional view of the first embodiment of the elongated elements in the active optical area.
Figure 2D:
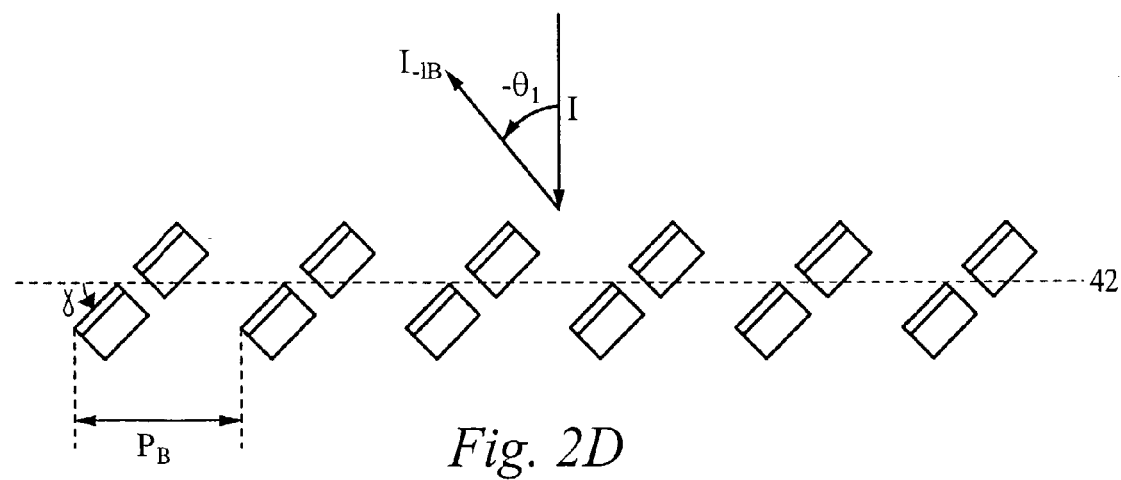
FIG. 2D illustrates the elongated elements of the first embodiment tilted counter-clockwise.
Figure 2E:
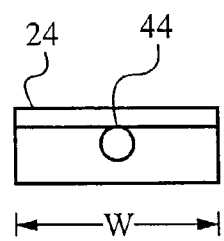
FIG. 2E illustrates the tilting-axis as a center-axis running lengthwise through the center of each elongated element.
Figure 2F:
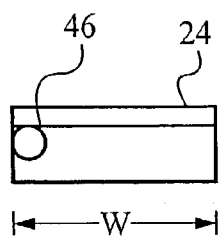
FIG. 2F illustrates the tilting-axis as an end-axis running lengthwise through an edge of each elongated element.

FIG. 2C illustrates a second cross-sectional view of the first embodiment of the elongated elements 24 in the active optical area. The second cross-sectional view of the first embodiment shows the elongated elements 24 in an activated state where each elongated element 24 is tilted about a tilting-axis of the elongated element 24 by a blaze angle γ. Preferably, the elongated elements 24 are tilted clockwise, as illustrated in FIG. 2C. Alternatively, the elongated elements 24 are tilted counter-clockwise, as illustrated in FIG. 2D. As illustrated in FIG. 2E, the tilting-axis is preferably a center-axis 44 running lengthwise through the center of each elongated element 24. Alternatively, as illustrated in FIG. 2F, the tilting-axis is an end-axis 46 running lengthwise through an edge of each elongated element 24. It is understood that the end-axis 46 can be on either edge of the elongated element 24, as long as the selected edge is the same edge for each elongated element 24. The blaze angle γ is given by the expression:

$$\gamma = \sin^{-1}(\lambda/2P)$$

In the activated state, the elongated elements 24 approximate a blazed grating. The activated state is also referred to as a blazed state. It is understood that the elongated elements 24 can be tilted at an angle other than the blaze angle γ to achieve a desired greyscale effect.

Preferably, to produce the blazed state, an electrical bias is applied between the first conductor 30 (FIG. 1) and the conducting and reflective surface 32 such that the electrostatic force is stronger on one side of each elongated element 24 than on the other side. Such a method of tilting is well known in the art. Alternatively, any method of tilting the elongated elements 24 using an electrical bias or other means can be used.

In the blazed state, the incident light I is diffracted into various orders of light. A first maxima of diffracted light while in the blazed state is located at a diffraction angle θ1B. Since each elongated element 24 is tilted, the element portions 40 are tilted as pairs in the case of two element portions 40 per elongated element 24. Such is the case in the first embodiment where there is a single slit 36 within each elongated element 24. As a result, a pitch while in the blazed state, expressed as a blazed pitch PB, is the same as the element pitch P. Therefore, the blazed pitch PB (the pitch in the blazed state) is approximately twice as large as the pitch Pf (the pitch in the flat state). As a result, a first order diffraction angle while in the blazed state can be approximated as:

$$\theta 1B = \theta 1.$$

I1B represents the intensity of the first order maxima of diffracted light collected at the diffraction angle θ1B while in the blazed state.

Contrast is expressed as the diffracted light collected at the diffraction angle θ1 while in the blazed state divided by the diffracted light collected at the diffraction angle θ1 while in the flat state. In the case where there is no slit 36 in each elongated element 24, the contrast C=I1B/I1f, since the first order maxima in both the flat state and the blazed state is located at the same diffraction angle θ1. To maximize the contrast, the magnitude of the diffracted light collected at the diffraction angle θ1 while in the flat state is reduced as much as possible. By adding the slit 36 to each elongated element 24, the first order maxima of diffracted light while in the flat state is effectively shifted from the diffraction angle θ1 to the diffraction angle 2θ1. Although this does not completely eliminate the diffracted light located at the diffraction angle θ1 while in the flat state (due to the gaussian distribution of the diffracted light, as will be explained below), the magnitude of the diffracted light located at the diffraction angle θ1 while in the flat state is greatly reduced. This significantly improves the contrast.

Figure 3A:
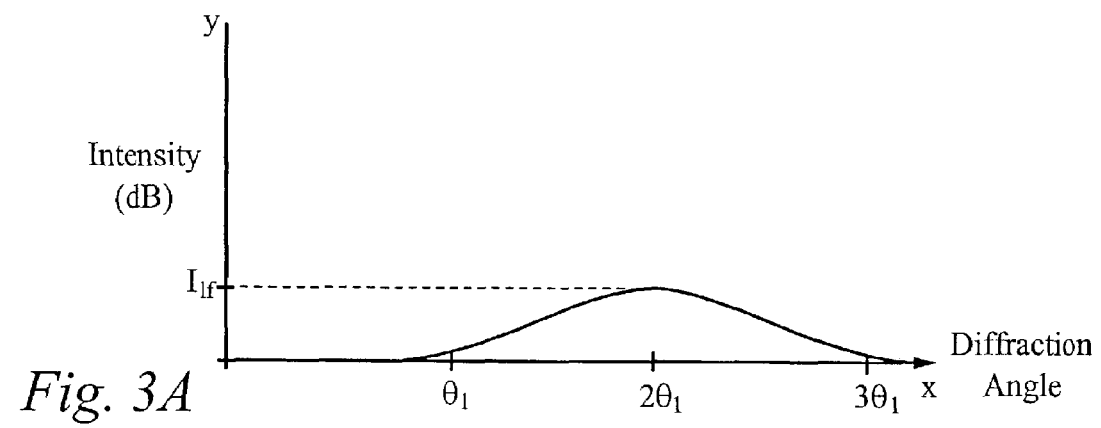
FIG. 3A illustrates an intensity distribution for a first maxima of diffracted light while in the flat state according to the first embodiment of the elongated elements.
Figure 3B:
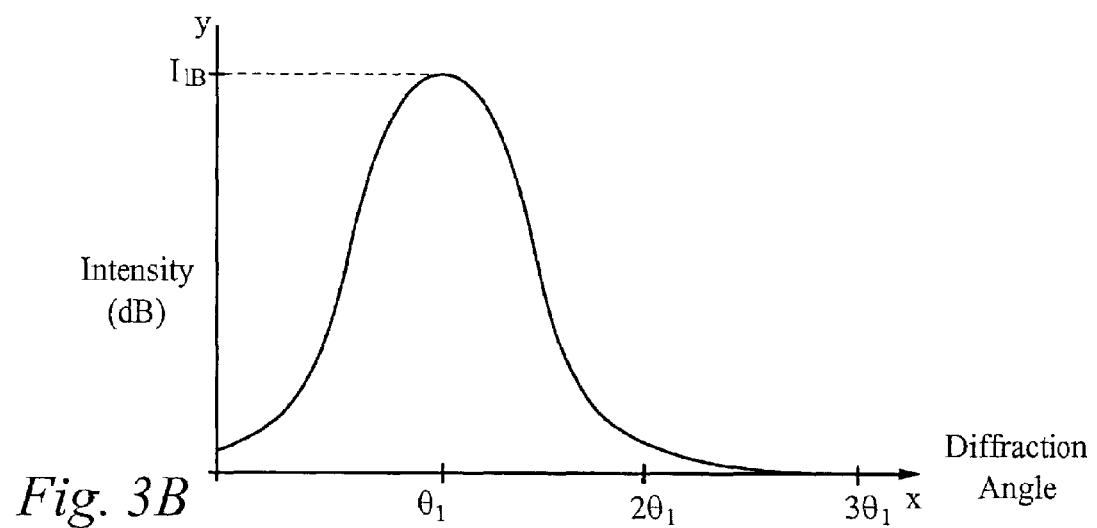
FIG. 3B illustrates an intensity distribution for a first maxima of diffracted light while in the blazed state according to the first embodiment of the elongated elements.
Figure 3C:
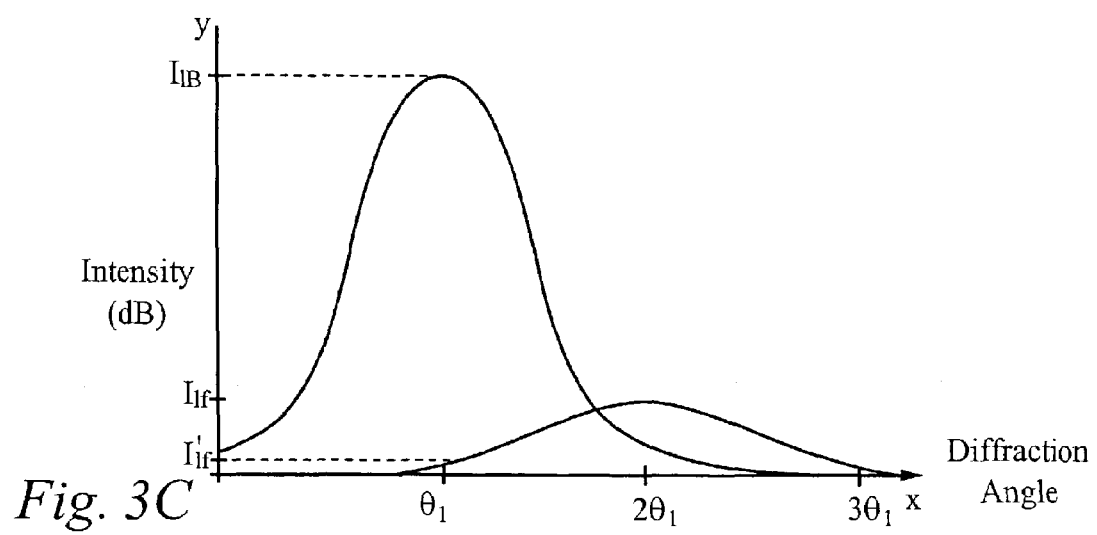
FIG. 3C illustrates the two intensity distributions illustrated in FIGS. 3A and 3B superimposed.

FIG. 3A illustrates an intensity distribution for the first maxima of diffracted light while in the flat state according to the first embodiment of the elongated elements 24. The first order diffracted light while in the flat state includes a flat-state first order maxima. The intensity distributions illustrated in FIGS. 3A–3C are gaussian distributions. As can be seen in FIG. 3A, the intensity of the first order maxima of diffracted light while in the flat state varies according to the diffraction angle. As discussed above, the first order maxima of the diffracted light intensity while in the flat state, I1f, is located at the diffraction angle θ1f. In the case of a single slit 36, the first order diffraction angle θ1f is equal to 2θ1. The light intensity decreases as the diffraction angle increases or decreases from the first order diffraction angle $2\theta1$. Due to the trailing edges of the gaussian distribution, there is a small amount of first order diffracted light while in the flat state at the diffraction angles $\theta1$ and $3\theta1$.

FIG. 3B illustrates an intensity distribution for the first order maxima of diffracted light while in the blazed state according to the first embodiment of the elongated elements 24. The first order diffracted light while in the blazed state includes the blazed-state first order maxima. As discussed above, the first order maxima of the diffracted light intensity while in the blazed state, I1B, is located at the diffraction angle $\theta1B$. In the case of a single slit 36, the first order diffraction angle $\theta1B$ is equal to $\theta1$. The light intensity decreases as the diffraction angle increases or decreases from the first order diffraction angle $\theta1$. Due to the trailing edges of the gaussian distribution, there is a small amount of first order diffracted light while in the flat state at the diffraction angles zero and $2\theta1$.

FIG. 3C illustrates the two intensity distributions illustrated in FIGS. 3A and 3B superimposed. Recall that in the case where there is no slit 36 in each elongated element 24, the contrast $C=I1B/I1f$. In the first embodiment where a single slit 36 is included in each elongated element 24, the contrast $C=I1B/I_{1F}'$. $I_{1F}'$ can be about 2–3 orders of magnitude lower than I1f. Such a reduction significantly improves the contrast C.

In operation, the diffractive light modulator of the present invention preferably collects the light diffracted at the plus first order diffraction angle $\theta1$. In the flat state, most of an incident light I is specularly reflected, while a portion of the incident light I is diffracted. In the first embodiment where there is a single slit 36 in each elongated element 24, and while in the flat state, a first order maxima of diffracted light, I1f, is located at a diffraction angle $2\theta1$. Due to the gaussian distribution of the diffracted light, a small portion of this diffracted light is diffracted at the diffraction angle $\theta1$. The intensity of this small portion of diffracted light can be orders of magnitude less than that at the first order maxima. This small portion is collected at the plus first order diffraction angle $\theta1$. In the blazed state, the elongated elements 24 have preferably been tilted clockwise about the tilting-axis by a blaze angle $\gamma$, as illustrated in FIG. 2C. While in the blazed state, a first order maxima of diffracted light, I1B, is located at a diffraction angle $\theta1B$. The diffraction angle $\theta1B$ is equal to the first order diffraction angle $\theta1$. Therefore, the diffracted light collected at the plus first order diffraction angle $\theta1$ while in the blazed state is the diffracted light I1B.

It is understood that while in the flat state, a first order maxima of diffracted light is also located at a diffraction angle $-2\theta1$. Since only the plus first order light is collected, the light diffracted at negative diffraction angles is not considered.

A second embodiment of a diffractive light modulator is identical to that of the first embodiment with the exception that each elongated element 24 includes two lengthwise slits 36. Increasing the number of slits 36 from one to two further increases the contrast. By adding a second slit 36, the elongated elements 24 include a pitch Pf' while in the flat state. The pitch Pf' is less than the pitch Pf from the first embodiment, and approximately one-third that of the element pitch P. The pitch Pf' causes a first order maxima of the diffracted light while in the flat state to be located at a diffraction angle $3\theta1$. By shifting the first order maxima to the diffraction angle $3\theta1$, the plus first order collected light at the diffraction angle $\theta1$ while in the flat state is further reduced from that collected in the first embodiment. This further improves the contrast over that of the single slit embodiment.

Figure 4A:
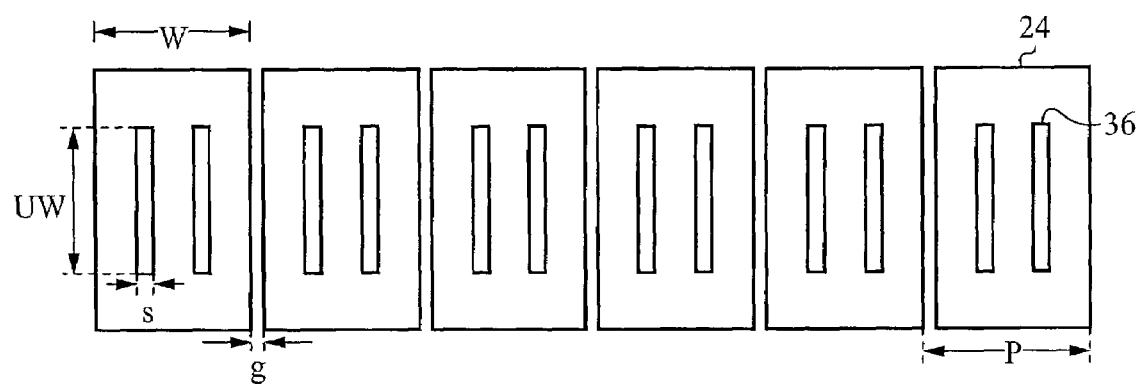
FIG. 4A illustrates a top-down view of a second embodiment of the elongated elements.

FIG. 4A illustrates a top-down view of the second embodiment of the elongated elements 24. Each elongated element 24 includes the element width W and is separated from an adjacent elongated element 24 by the gap width g. The slit 36 is at least as long as the optical width OW. The optical width OW corresponds to an active optical area of the grating light valve type device 20 on which the incident light impinges the elongated elements 24. The portion of the elongated elements 24 comprising the slits 36 includes the active optical area. A remaining portion of the elongated elements 24 that does not include the slits 36 is referred to as a non-active optical area. Each slit 36 includes the slit width S. Preferably, the slit width S and the gap width g are equal. The element pitch P is defined as the element width W plus the gap width g.

Figure 4B:
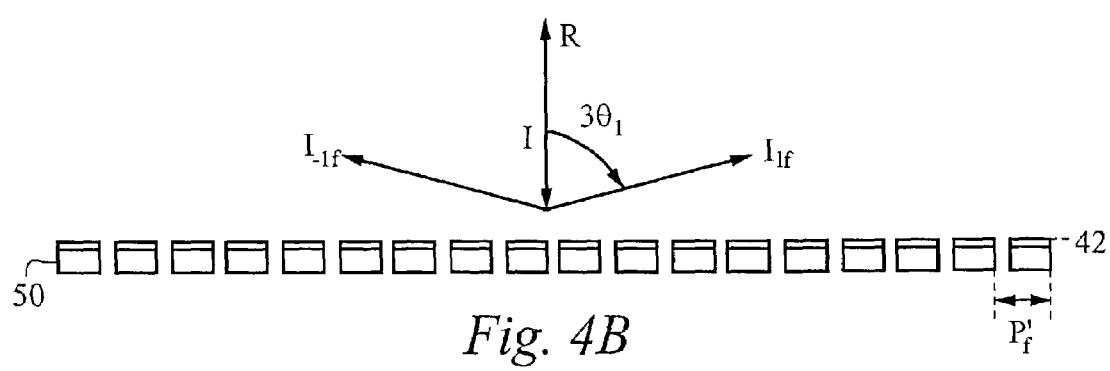
FIG. 4B illustrates a first cross-sectional view of the second embodiment of the elongated elements in the active optical area.

FIG. 4B illustrates a first cross-sectional view of the second embodiment of the elongated elements 24 in the active optical area. Preferably each slit 36 cuts through the entire thickness of the elongated element 24, and equally divides each elongated element 24 into three element portions 50 within the optical width OW. This essentially triples the number of elongated elements within the active optical area, in the case of the second embodiment. A width of the element portion 50 is about one-third the element width W. The first cross-sectional view of the second embodiment illustrated in FIG. 4B shows the elongated elements 24 in the non-activated state. The non-activated state is also referred to as the flat state. In the flat state, the elongated elements 24 include the pitch Pf', and the conductive and reflective surfaces 32 define the grating plane 42. By reducing the element width within the active optical area by two-thirds, the pitch Pf' is essentially reduced by two-thirds when compared to the element pitch P. In the flat state, there is preferably zero electrical bias between the elongated elements 24 and the first conductor 30 (FIG. 1). The incident light I of wavelength $\lambda$ preferably impinges the element portions 50 normal to the grating plane 42.

In the flat state, the incident light I is reflected off the elongated elements 24 into a zeroth diffraction order as reflected light R. Ideally, all incident light I is specularly reflected while in the non-activated state. However, due to the gaps between the elongated elements 24 and the slits 36 within the elongated elements 24, the incident light I is also diffracted into various orders of light.

In the case where there are two slits 36 within each elongated element 24, then the pitch becomes the pitch Pf'. While in the flat state, a first maxima of the diffracted light is located at the diffraction angle $\theta1f=\arcsin(\lambda/(W/3+g))$ where P is replaced by Pf'. As can be seen in FIG. 4B, Pf' is approximately W/3+g. Since the diffraction angles are sufficiently small, the diffraction angle $\theta1f$ can be approximated as:

$$\theta1f=3(\lambda/(W+g)).$$

Since $\lambda/(W+g)$ is the first order diffraction angle $\theta1$ when the elongated elements 24 do not have a slit 36, $\theta1f$ can be approximated as:

$$\theta1f=3\theta1.$$

I1f represents the intensity of the first order maxima of diffracted light collected at the first order diffraction angle $\theta1f$ while in the flat state. By introducing two slits 36 into each elongated element 24, the pitch is effectively reduced by two-thirds. This has the effect of shifting the first order maxima of the diffracted light while in the flat state from the diffraction angel θ1 to the diffraction angle θ3.

Figure 4C:
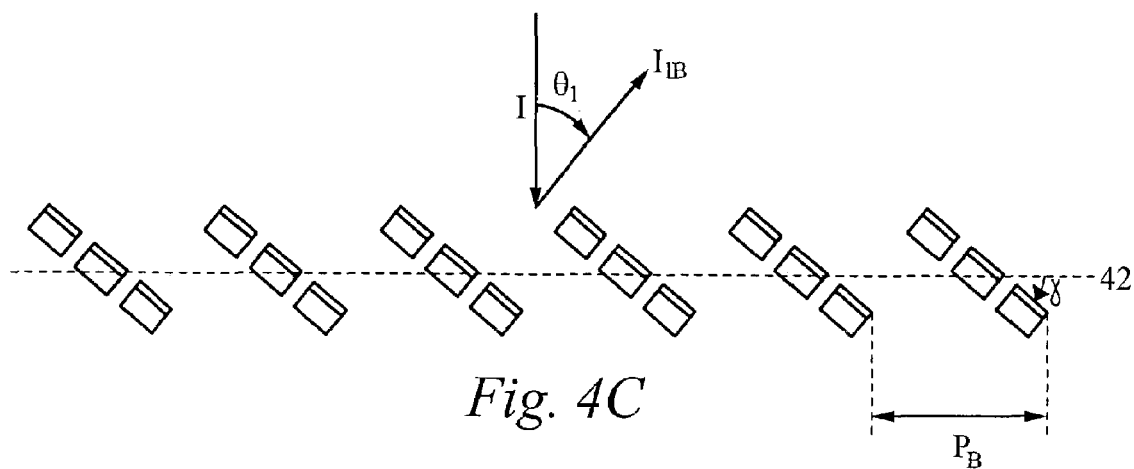
FIG. 4C illustrates a second cross-sectional view of the second embodiment of the elongated elements in the active optical area.
Figure 4D:
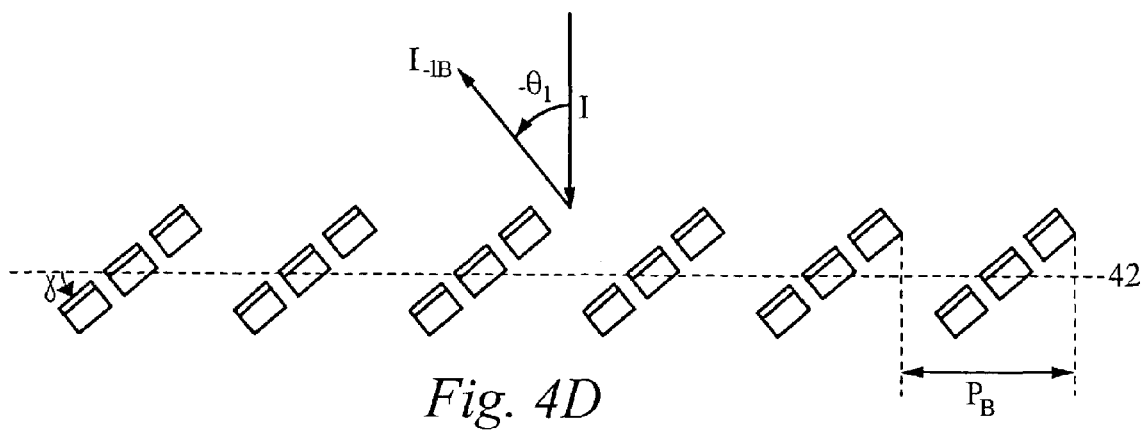
FIG. 4D illustrates the elongated elements of the second embodiment tilted counter-clockwise.

FIG. 4C illustrates a second cross-sectional view of the second embodiment of the elongated elements 24 in the active optical area. The second cross-sectional view of the second embodiment shows the elongated elements 24 in the blazed state where each elongated element 24 is tilted about a tilting-axis of the elongated element 24 by the blaze angle γ. Alternatively, each elongated element 24 can be tilted at an angle other than the blaze angle. Preferably, the elongated elements 24 are tilted clockwise, as illustrated in FIG. 4C. Alternatively, the elongated elements 24 are tilted counter-clockwise, as illustrated in FIG. 4D. As illustrated in FIG. 2E, the tilting-axis is preferably a center-axis 44 running lengthwise through the center of each elongated element 24. Alternatively, as illustrated in FIG. 2F, the tilting-axis is an end-axis 46 running lengthwise through an edge of each elongated element 24. It is understood that the end-axis 46 can be on either edge of the elongated element 24, as long as the selected edge is the same edge for each elongated element 24. In the blazed state, the elongated elements 24 approximate a blazed grating.

Preferably, to produce the blazed state, an electrical bias is applied between the first conductor 30 (FIG. 1) and the conducting and reflective surface 32 such that the electrostatic force is stronger on one side of each elongated element 24 than on the other side. Such a method of tilting is well known in the art. Alternatively, any method of tilting the elongated elements 24 using an electrical bias can be used.

In the blazed state, the incident light I is diffracted into various orders of light. A first maxima of diffracted light while in the blazed state is located at a diffraction angle θ1B. Since each elongated element 24 is tilted, the element portions 50 are tilted as threesomes in the case of three element portions 50 per elongated element 24. Such is the case in the second embodiment where there are two slits 36 within each elongated element 24. As a result, a pitch while in the blazed state, expressed as the blazed pitch PB, in the two slit embodiment is the same as the blazed pitch PB in the one slit embodiment. The blazed pitch PB is also the same as the element pitch P. Therefore, the blazed pitch PB (the pitch in the blazed state) is approximately three times as large as the pitch Pf (the pitch in the flat state). As a result, a first order diffraction angle while in the blazed state can be approximated as:

θ1B=θ1.

I1B represents the intensity of the first order maxima of diffracted light collected at the diffraction angle θ1B while in the blazed state.

In the case where there is no slit 36 in each elongated element 24, the contrast C=I1B/I1f, since the first maxima in both the flat state and the blazed state is located at the same diffraction angle θ1. To maximize the contrast, the magnitude of the diffracted light collected at the diffraction angle θ1 while in the flat state is reduced as much as possible. By adding two slits 36 to each elongated element 24, the first order maxima of diffracted light while in the flat state is effectively shifted from the diffraction angle θ1 to the diffraction angle 3θ1. Although this does not completely eliminate the diffracted light located at the diffraction angle θ1 while in the flat state (due to the gaussian distribution of the diffracted light), the magnitude of the diffracted light located at the diffraction angle θ1 while in the flat state is greatly reduced. The magnitude of the diffracted light located at the diffraction angle θ1 while in the flat state for the two slit embodiment is less than that for the one slit embodiment. Therefore, the contrast in the two slit embodiment is greater than the contrast in the one slit embodiment.

In operation, the diffractive light modulator of the present invention preferably collects the light diffracted at the plus first order diffraction angle θ1. In the flat state, most of an incident light I is specularly reflected, while a portion of the incident light I is diffracted. In the second embodiment where there are two slits 36 in each elongated element 24, and while in the flat state, a first order maxima of diffracted light, I1f, is located at a diffraction angle 3θ1. Due to the gaussian distribution of the diffracted light, a small portion of this diffracted light is diffracted at the diffraction angle θ1. The intensity of this small portion of diffracted light can be orders of magnitude less than that at the first order maxima. This small portion is collected at the plus first order diffraction angle θ1. In the blazed state, the elongated elements 24 have preferably been tilted clockwise about the tilting-axis by a blaze angle γ, as illustrated in FIG. 4C. While in the blazed state, a first order maxima of diffracted light, I1B, is located at a diffraction angle θ1B. The diffraction angle θ1B is equal to the first order diffraction angle θ1. Therefore, the diffracted light collected at the plus first order diffraction angle θ1 while in the blazed state is the diffracted light I1B.

It is understood that while in the flat state, a first order maxima of diffracted light is also located at a diffraction angle −3θ1. Since only the plus first order light is collected, the light diffracted at negative diffraction angles is not considered.

Alternatively, the diffractive light modulator of the present invention collects the light diffracted at the negative first order diffraction angle −θ1. In this alternative embodiment, the elongated elements 24 are tilted counter-clockwise about the tilting axis, as illustrated in FIGS. 2D and 4D, and the light diffracted at the negative first order diffraction angle −θ1 is collected in both the flat state and the blazed state. It should be clear to those skilled in the art that although the embodiments describe above refer to collecting either the plus first order light or the negative first order light, both the plus and minus first order light can be collected simultaneously. It is also understood that the elongated elements 24 can include more than two slits 36.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiment chosen for illustration without departing from the spirit and scope of the invention.

What is claimed:

1. A blazed grating device comprising:
   a. a plurality of elongated elements, each element including one or more lengthwise slits within an active optical area and a light reflective planar surface, the light reflective planar surfaces lying in a grating plane; and
   b. a support structure coupled to the elongated elements to maintain a position of the elongated elements relative to each other and to enable rotational tilting of each element about a lengthwise axis, and between a blazed configuration wherein the elongated elements act to diffract an incident light into a first distribution of diffracted light with first-order diffraction at a first angle θ1B, and a flat configuration wherein the elongated elements act to diffract the incident light into a second distribution of diffracted light with first-order diffraction at a second angle which is a multiple (at least twice) of the first angle θ1B, wherein the one or more slits symmetrically divide the width of the element within the active optical area into a plurality of segments of substantially equal width, and wherein the elongated elements are rotationally tilted to a blaze angle with respect to the grating plane.

2. The blazed grating device according to claim 1 wherein a width of the slit equals a width of a gap between each element.

3. The blazed grating device according to claim 1 wherein the incident light impinges the active optical area of the elongated elements normal to the grating plane.

4. The blazed grating device according to claim 1 wherein the second angle is about twice the first angle θ1B.

5. The blazed grating device according to claim 1 wherein the second tangle is about the first θ1B times the sum of the number of slits plus one.

6. The blazed grating device according to claim 1 wherein a resultant contrast is heightened due to a higher ratio between intensities of the first and second distributions at said first angle θ1B.

7. The blazed grating device according to claim 1 wherein the slits are cut through the thickness of the elongated element.

8. The blazed grating device according to claim 1 wherein the slits are formed by removing a corresponding portion of the reflective surface of the elongated element.

9. The blazed grating device according to claim 1, wherein said rotational tilting is performed around a lengthwise axis, and wherein the lengthwise axis is a center axis of the elongated element.

10. The blazed grating device according to claim 1, wherein said rotational tilting is performed around a lengthwise axis, and wherein the lengthwise axis is an edge axis of the elongated element.

11. The blazed grating device according to claim 1 further comprising means for applying an electrical bias to each element to enable said rotational tilting of each element.

12. The blazed grating device according to claim 1 wherein a length of each slit is at least as long as a width of the active optical area.

13. A method of diffracting an incident light utilizing a blazed grating comprising:
    a. supporting a plurality of elongated elements, each element including one or more lengthwise slits within an active optical area and a light reflective planar surface with the light reflective planar surface, with the light reflective planar surfaces lying in a grating plane;
    b. rotationally tilting the plurality of elongated elements about a lengthwise axis, and between blazed configuration and a flat configuration; and
    c. diffracting an incident light such that in the blazed configuration the incident light is diffracted into a first distribution of diffracted light with first-order diffraction at a first angle θ1B and in the flat configuration the incident light is diffracted into a second distribution of diffracted light with first-order diffraction at a second angle which is a multiple (at least twice) of the first angle θ1B,
    wherein each slit is cut through an entire thickness of the elongated element, and
    wherein the elongated elements are rotationally tilted to a blaze angle with respect to the grating plane.

14. The method according to claim 13 wherein a resultant contrast is heightened due to a higher ratio between intensities of the first and second distributions at said first angle θ1B.

15. The method according to claim 13 wherein tilting the plurality of elements is performed by applying an electrical bias to each element.

16. A blazed grating device comprising:
    a. means for supporting a plurality of elongated elements, each element including one or more lengthwise slits within an active optical area and a light reflective planar surface, with the light reflective planar surfaces lying in a grating plane;
    b. means for rotational tilting the plurality of elongated elements about a lengthwise axis, and between a blazed configuration and a flat configuration; and
    c. means for diffracting an incident light such that in the blazed configuration the incident light is diffracted into a first distribution of diffracted light with first-order diffraction at a first angle θ1B and in the flat configuration the incident light is diffracted into a second distribution of diffracted light with first-order diffraction at a second angle which is a multiple (at least twice) of the first angle θ1B,
    wherein each slit goes through an entire thickness of the elongated element, and
    wherein the elongated elements are rotationally tilted to a blaze angle with respect to the grating plane.

* * * * *